United States Patent [19]
Walker et al.

[11] Patent Number: 6,086,477
[45] Date of Patent: Jul. 11, 2000

[54] METHODS AND APPARATUS WHEREIN A LOTTERY ENTRY IS ENTERED INTO LOTTERY DRAWINGS UNTIL THE LOTTERY ENTRY IS IDENTIFIED AS A WINNER

[75] Inventors: Jay S. Walker, Ridgefield; Thomas M. Sparico, Riverside; James A. Jorasch, Stamford, all of Conn.

[73] Assignee: Walker Digital, LLC, Stamford, Conn.

[21] Appl. No.: 09/052,295

[22] Filed: Mar. 31, 1998

[51] Int. Cl.[7] .................................................. A63F 9/24
[52] U.S. Cl. ................................................ 463/17; 463/16
[58] Field of Search ......................................... 463/17, 16

[56] References Cited

U.S. PATENT DOCUMENTS

| | | | |
|---|---|---|---|
| 4,997,188 | 3/1991 | Nilssen ....................................... | 705/14 |
| 5,082,275 | 1/1992 | Nilssen ....................................... | 463/17 |
| 5,083,272 | 1/1992 | Walker et al. .............................. | 463/25 |
| 5,157,602 | 10/1992 | Fields et al. . | |
| 5,186,463 | 2/1993 | Marin et al. . | |
| 5,505,449 | 4/1996 | Eberhardt et al. ......................... | 463/29 |
| 5,772,511 | 6/1998 | Smeltzer ..................................... | 463/17 |
| 5,818,026 | 10/1998 | Melling et al. ............................. | 235/470 |
| 5,954,582 | 9/1999 | Zach ........................................ | 463/25 |

OTHER PUBLICATIONS

Scame, Scame's New Complete Guide to Gambling, 1973, Simon & Schuster, p. 175.
Deborah Evans Price, "David Lee Murphy's Top Shelf Set", Billboard Magazine, Apr. 13, 1996.
"Fundraiser was Art for Life's Sake", The Times–Picayune, Dec. 8, 1994 at p. B6.
Fred W. Lindecke, "It's a Winner! New Lottery Game Guarantees a Prize", St. Louis Times–Dispatch Apr. 4, 1992 at p. 5A.
Laura Loro, "Lottery Ticket Offers Caash and Coupons", Advertising Age, Jul. 6, 1992 at p. 24.
"Backups Likely at Skyway Toll Plaza", St. Petersburg Times, Mar. 15, 1994 at p. 1B.
"Savings Bank's Instant Lottery Draws Customers to New Office", The American Banker, Mar. 18, 1996 at p. 14.

*Primary Examiner*—Jessica J. Harrison
*Assistant Examiner*—Corbett B. Coburn, III
*Attorney, Agent, or Firm*—Jeffrey L. Brandt; Patrick J. Buckley

[57] ABSTRACT

A system and process for generating, distributing, and processing lottery tickets guaranteed to win a drawing-based prize. Tickets are appropriately priced, and are validated at point of sale by a central server in which the ticket information is stored. Subsequent to each lottery drawing, the winning lottery numbers are compared to the entries in a never-lose ticket database to determine if any of the entries match the winning numbers. Winning entries are appropriately identified and tagged as inactive, while entries that have not yet won a drawing-based prize remain active for future drawings.

Ticket pricing methodology is provided for appropriately pricing never-lose tickets. A method and apparatus are further provided whereby a ticket holder may query the status of a never-lose ticket directly from the server.

76 Claims, 21 Drawing Sheets

TICKET DATABASE 40

| GAME TYPE 52 | TICKET IDENTIFIER 54 | NUMBERS SELECTED 56 | DATE OF PURCHASE 58 | NEXT DRAWING 60 | DEALER IDENTIFIER 62 |
|---|---|---|---|---|---|
| LOTTO 6-49 | 12345 | 1,5,9,15,21,25 | 3/15/97 | 3/18/97 | 44444563 |
| LOTTO 6-49 | 12346 | 2,6,11,17,24,32 | 3/15/97 | 3/18/97 | 44444563 |
| LOTTO 6-49 | 12347 | 3,7,12,18,25,33 | 3/15/97 | 3/18/97 | 44444564 |
| LOTTO 6-49 | 12348 | 4,8,13,19,26,34 | 3/15/97 | 3/18/97 | 44345566 |
| LOTTO 6-49 | 12352 | 2,5,9,19,21,23 | 3/21/97 | 3/21/97 | 53445245 |

Rows: 50A, 50B, 50C, 50D, 50E

FIG. 4

| GAME TYPE 68 | TICKET IDENTIFIER 70 | DATE OF PURCHASE 72 | NEXT DRAWING 74 | DEALER IDENTIFIER 76 | STATUS 78 | NUMBERS SELECTED 80 |
|---|---|---|---|---|---|---|
| LOTTO 6-49 | 23456 | 3/15/97 | 3/21/97 | 44444563 | ACTIVE | 1,2,3,4,5,6 |
| LOTTO 6-49 | 23457 | 3/15/97 | 3/21/97 | 44444563 | ACTIVE | 2,4,6,8,10,12 |
| LOTTO 6-49 | 23458 | 3/15/97 | 3/21/97 | 44444563 | ACTIVE | 4,11,14,36,37,38 |
| LOTTO 6-49 | 23459 | 3/15/97 | 3/21/97 | 44444563 | ACTIVE | 7,14,21,28,35,42 |
| LOTTO 6-49 | 12352 | 3/21/97 | 3/21/97 | 44444563 | CLOSED | 1,5,19,21,23,30 |

NEVER LOSE TICKET DATABASE 42

WINNING TICKET DATABASE 44

| GAME TYPE 90 | DRAWING DATE 92 | NUMBERS DRAWN 94 | TICKET IDENTIFIER 96 | NUMBERS SELECTED 98 | PRIZE 100 |
|---|---|---|---|---|---|
| LOTTO 6-49 | 3/18/97 | 1,5,9,19,21,23 | 12345 | 1,5,9,15,21,25 | $100 |
| LOTTO 6-49 | 3/18/97 | 1,5,9,19,21,23 | 12352 | 2,5,9,19,21,23 | $1,000 |
| LOTTO 6-49 | 3/21/97 | 4,11,20,30,36,39 | 23458 | 4,11,14,36,37,38 | $2 |
| LOTTO 6-49 | 3/21/97 | 4,11,20,30,36,39 | 34567 | 3,7,20,30,36,37 | $2 |

DEALER DATABASE 46

| DEALER IDENTIFIER 104 | ADDRESS 106 | TELEPHONE NUMBER 108 | NAME 110 |
|---|---|---|---|
| 44444563 | 123 AUTUMN RD. TOWN, CT | 1,5,9,15,21,25 | FRED'S DELI |
| 44444564 | 456 SPRING STREET VILLAGE, CT | 2,6,11,17,24,32 | LOCAL GROCERY |
| 44345566 | 6789 METROPOLITAN AVE. CAPITOL CITY, CT | 3,7,12,18,25,33 | FULL SERVE GAS N' GO |
| 53445245 | 135 MAIN ST. TOWN, CT | 4,8,13,19,26,34 | FAMILY DINER |

102A → (row 1)
102B → (row 2)
102C → (row 3)
102D → (row 4)

FIG. 7

METHODS AND APPARATUS WHEREIN A LOTTERY ENTRY IS ENTERED INTO LOTTERY DRAWINGS UNTIL THE LOTTERY ENTRY IS IDENTIFIED AS A WINNER

FIELD OF THE INVENTION

The present invention relates generally to lotteries and more specifically to methods and apparatus for generating and processing lottery entries.

BACKGROUND OF THE INVENTION

Lotteries currently generate over $30 billion in ticket sales in the US alone. Thirty-eight states in the US offer at least one government-sponsored lottery, with much of the profits going to augment the state tax base, for example by funding state educational systems.

In a typical operation, a lottery is operated by a central authority with a government-licensed sponsor providing much of the equipment and support necessary to establish, market, and run the operation. Such a central authority typically maintain, one or more centralized operations for receiving and processing lottery entries, the entries themselves being sold at remote authorized lottery outlets or terminals.

A purchase of a lottery ticket typically requires a visit to one of the authorized lottery outlets, where the process varies depending on the type of game to be played. Commonly known games include 'instant' tickets, or 'scratch' tickets, where the winning status is apparent on the face of the ticket, and 'Lotto' games where the player picks or otherwise receives a set of entry numbers, the status of the numbers determined by a match with numbers selected in a subsequent lottery drawing. The present invention has particular application to Lotto style lotteries, which will be discussed in detail herein.

In a Lotto game, a player selects one or more numbers, the exact format, quantity and ordinal value range of the numbers being dependent on the type of game. In a "6/49" game, for example, six numbers are selected, each in the range from one to forty-nine. The numbers may be selected individually by the purchaser. Alternatively, many lottery authorities offer a 'quick-pick' option whereby, upon request by the purchaser, a random number generator controlled by the lottery authority is used to select the entry numbers. In either case, the actual ticket request is typically made through the completion of a 'sense mark form,' or 'bet slip,' which is a machine-readable paper form having check boxes that are filled in by the purchaser and read by the lottery terminal. For a further description of "Lotto" style lottery games, including the 6/49 game, reference is made to *Dr. Z's 6/49 Lotto Guidebook*, by Ziemba, Dr. William T., et al., published 1986 by Dr. Z Investments, Inc., ISBN 0-9690097-2-2, incorporated herein by reference.

The ticket purchase information is read by the local lottery terminal and transmitted to the central lottery authority. The central authority processes the ticket request by storing the selected lottery numbers, and assigning a ticket identifier. An appropriate ticket is printed at the terminal and sold to the player. The ticket is kept by the player as validation of an entry in a lottery drawing, which is typically held once or twice per week.

A lottery ticket is typically good for one lottery drawing. Thus, each entry in a lottery normally requires a trip to a lottery terminal to purchase a ticket.

Recently, limited options have been made available whereby lottery tickets may be purchased without visits to a lottery agent. To increase ticket sales, as well as for customer-convenience, some lotteries now offer subscription sales of lottery tickets. With a subscription ticket, lottery entries are automatically re-entered into drawings for a predefined number of weeks. Such subscription tickets are often made available at a discounted price. The Vermont State Lottery, for example, offers multiple drawing "contracts," or a subscription, whereby a player can enter selected numbers in multiple drawings. While a lottery subscription is more convenient, there is no guarantee that the player will win any prize.

In most lotteries, a jackpot that is not won by a player in a drawing is "rolled over" into the next drawing. In fact, the value of the jackpot is usually progressive, in that it increases each time a winner does not result from a drawing. While the lottery jackpot remains progressive, however, each ticket is typically only valid for a single drawing. Even with subscription purchases, the subscription or contract represents a virtual series of tickets, each good for a predetermined drawing. Despite the fact that the purchase of a ticket is not required for every single drawing in which an entry is required, significant time, energy and planning are still required on the part of a player to purchase lottery tickets, with, of course, no guarantee of a winning return.

One system for enabling lottery players to reuse lottery tickets in subsequent lottery drawings is disclosed in U.S. Pat. No. 5,186,463 to Marin. The Marin patent teaches a system and method by which a lottery player may purchase a lottery entry which is applied to all subsequent drawings in which a jackpot prize is not awarded. Thus, if a jackpot is not awarded for three drawings subsequent to the purchase of the ticket, the ticket is automatically valid and re-entered into each of those drawings. The ticket becomes invalid or expired upon the award of a jackpot, whether that ticket represented a winning selection or not. Thus, the Marin patent relieves at most a small part of the burden of traveling to a lottery agent and waiting on line to purchase lottery tickets.

A number of lottery agencies have adopted the practice of selling lottery tickets that offer bonus prizes in addition to qualifying for prizes associated with a drawing. Still other lottery tickets include promotions offering discounts on products or services if the tickets do not win a drawing-based prize. The Missouri Lottery, for example, offers an instant win ticket having on one side an entry for a lottery prize of up to $1,000 in cash, and on the other side a "bonus spot" providing an opportunity to win one prize from amongst millions of prizes donated by local businesses. Along similar lines, the Pennsylvania Lottery offers a "Cookout Cash" ticket. The "Cookout Cash" ticket is a lotto style ticket which further includes a coupon redeemable for a discounted meal if a prize is not won in a weekly drawing. These programs typically involve promotional advertising by businesses in partnership with a lottery authority. Despite the fact that a purchaser is guaranteed at least a nominal value for each ticket, the tickets are only valid for a single lottery drawing, requiring a player to purchase subsequent tickets to participate in subsequent drawings.

Similar to the state lottery programs described above, private companies have also offered promotional lottery games in which every ticket represents at least a nominal value to the player. Liberty Bank, for example, has offered instant tickets with guaranteed prizes ranging from $0.50 to $100. Similarly, MCA has offered free scratch-and-win cards in which a ticket that does not win through the scratch-off game can be used to obtain a $2 discount on a compact disc at a participating retailer. A further example of a promotional lottery ticket was offered as a benefit for "Art Against Aids," wherein a ticket holder was guaranteed to win one of more than 100 donated art pieces.

While the games described above guarantee a prize for every player, the guaranteed prizes typically represent nominal promotional values. They do not represent the potential to win a significant, drawing-based lottery award, nor are the prizes awarded from the actual lottery prize pool.

Thus, to the best of applicants' knowledge, participation in a lottery drawing has in the past required that a ticket be purchased specifically for that drawing. While some subscription and contract services are now available, whereby entries can be purchased for a series of drawings, the entries are limited to a pre-determined number of drawings, regardless of the results of those drawings. In the instance of Marin, a purchased ticket might have some limited carry-over opportunity if a jackpot is not awarded in a drawing.

SUMMARY OF THE INVENTION

Given the deficiencies of the prior art in making participation in lotteries convenient to players, it would be most desirable to provide a lottery ticket that is entered into subsequent lottery drawings until that ticket wins a drawing-based prize. Such a ticket would make participation in lottery drawings significantly more convenient and attractive to interested players than has heretofore been available. Such a ticket would desirably have the result of increasing player participation in lotteries, thereby providing the opportunity for a lottery to award more prizes while yielding a higher return to the sponsoring party or government organization.

An object of the present invention is thus to provide a method and apparatus for generating and processing lottery entries whereby a lottery entry is effective for consideration in lottery drawings until that entry wins a drawing-based prize.

Another object of the invention is to provide a method and apparatus for operating a lottery wherein entries are accepted for consideration in lottery drawings until each entry wins a drawing-based prize.

In accordance with one aspect of the present invention, there is provided a method, apparatus, and program product for operating a lottery, the method comprising the steps of: receiving a result of a lottery drawing; comparing the result to a plurality of stored lottery entries; and if the result corresponds to one of the plurality of stored lottery entries, identifying the one entry as a winning lottery entry. At least one non-winning lottery entry is identified from the plurality of stored lottery entries, and the method is continued for (at least one) subsequent lottery drawing(s) until the at least one non-winning lottery entry is identified as a winning lottery entry.

In accordance with another aspect of the present invention, there is provided a method, apparatus, and program product for generating lottery entries usable in a plurality of lottery drawings, the method comprising the steps of: receiving a request to purchase a lottery entry; and receiving with the request an indicator that the lottery entry is to be entered into a plurality of lottery drawings until a lottery drawing identifies the lottery entry as a winner. A ticket identifier is generated for the lottery entry to validate the lottery entry and the indicator, and the ticket identifier is transmitted to a remote terminal.

BRIEF DESCRIPTION OF THE FIGURES

These and other objects, features and advantages of the invention will become apparent from a consideration of the detailed description of the invention when read in conjunction with the drawing figures, in which:

FIG. 4 is a table illustrating the contents of the ticket database of FIG. 3;

FIG. 5 is a table illustrating the contents of the never lose ticket database of FIG. 3;

FIG. 6 is a table illustrating the contents of the winning ticket database of FIG. 3;

FIG. 7 is a table illustrating the contents of the dealer database of FIG. 3;

DETAILED DESCRIPTION OF THE INVENTION

System

In accordance with a preferred embodiment of the invention, a never-lose entry in a lottery remains active, and is thus re-entered in subsequent lottery drawings, until the entry wins a drawing-based prize. That is, the never-lose entry is active until it matches a winning lottery result, i.e. a winning lottery number.

This is in contrast to prior art lotteries wherein a losing ticket might win a prize based on a donated or promotional good or service unrelated to a lottery drawing result.

The term "never-lose" is applied herein to lottery entries, tickets, and other apparatus and steps pertinent to operating a never-lose lottery game in accordance with the present invention. Such never-lose entries can be used in conjunction with conventional lottery games, which applicants then describe as comprising never-lose lottery games.

As will become apparent from a consideration of the detailed description below, the present invention has the advantage of enabling a player, using only a single purchased entry, to participate in that number of lottery drawings necessary to win a drawing-based prize. In prior art lottery drawings, a player seeking a drawing-based prize would often have to buy many tickets to achieve this goal. The invention thus greatly simplifies the ticket purchasing process. Further, in the preferred embodiment a player is fully capable of winning any of the available drawing-based prizes, including the jackpot or top prize, for each of the drawings in which the never-lose entry is active.

By way of background, the preferred embodiment of the present invention is operative in conjunction with a conventional state lottery program. In such programs, several of which are referenced above, a centralized lottery authority, for example a state or a state-licensed authority, processes lottery entries and payouts through many dedicated, remote lottery terminals. Such terminals are typically licensed to and operated by local retail stores.

Figure 1:
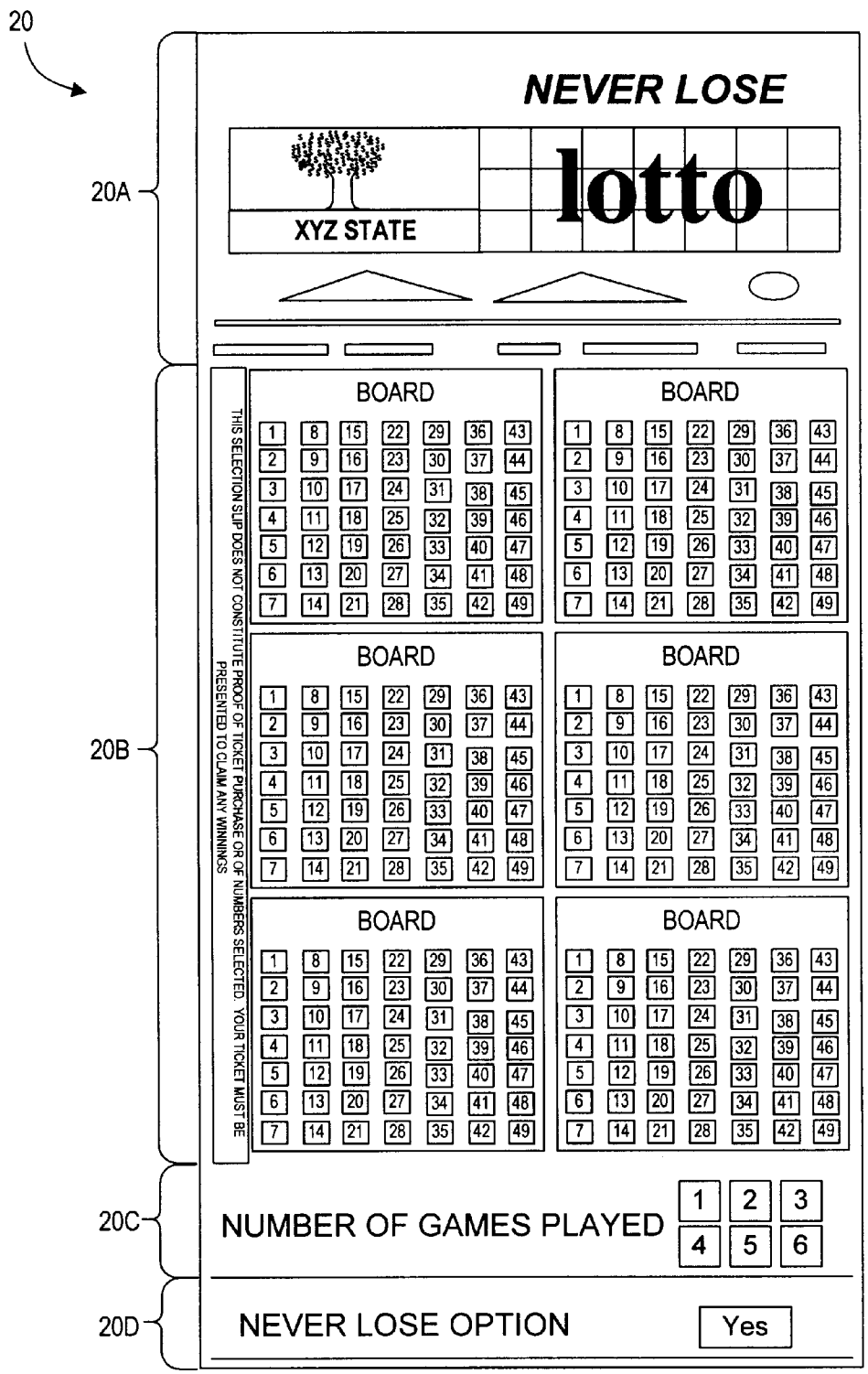
FIG. 1 is a plan view of a printed sense mark strip for procuring a lottery ticket to participate in a lottery in accordance with the present invention.
Figure 2:
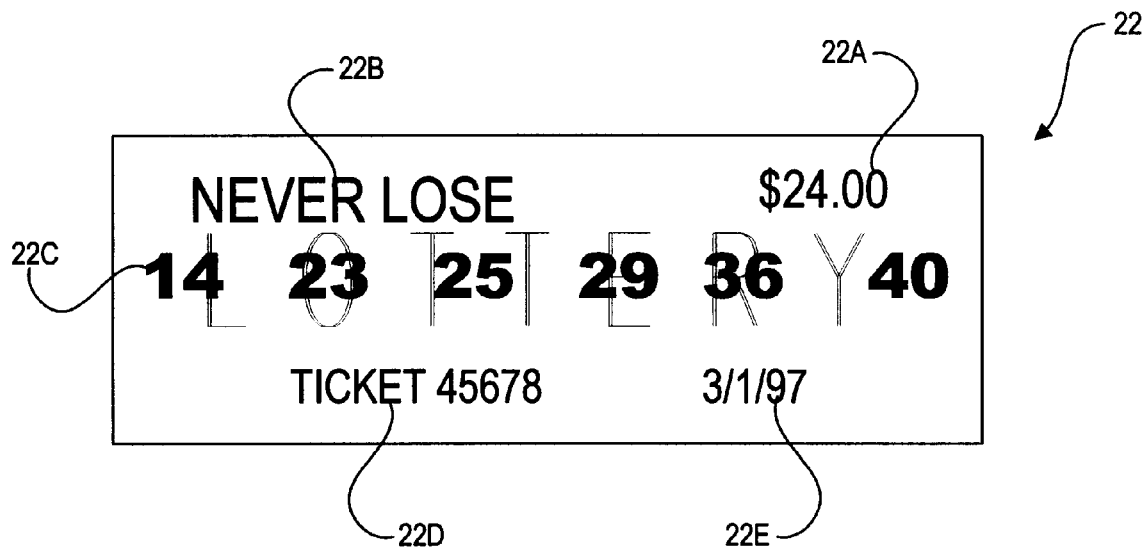
FIG. 2 is a plan view of a printed lottery ticket for participating in a lottery in accordance with the present invention.

Referring now to FIGS. 1 and 2, a sense mark form 20, or "bet slip," is shown whereby a never-lose ticket 22 can be purchased at a lottery terminal of the type described herein below. Form 20, typically printed on paper and including fill-in regions intended to be blackened-in with pencil, includes a printed header region 20A containing indicia identifying a particular state lottery game. A region 20B includes printed game boards whereby player-selected numbers are blackened to identify a selected lottery ticket entry. A region 20C includes printed blocks which can be blackened to select a set number of games for which the entry is active, while a region 20D provides the player a printed block which can be blackened to indicate a purchase of a never-lose lottery entry in accordance with the present invention.

Examining form 20 of FIG. 1, header 20A is seen to include an identifier for a "NEVER LOSE lotto" entry in an "XYZ STATE" lottery drawing. Six boards in region 20B each permit a player to select six numbers (in the illustrated embodiment) between one and forty-nine, thereby enabling a player to select up to six separate, six number entries. Region 20C enables a player to identify the number of games to be played based on the number of boards which have been filled out in region 20B. Region 20D enables the player to select the never-lose option for the lottery numbers he is entering.

With specific reference to FIG. 2, ticket 22, provided as a result of processing a completed bet slip, identifies a lottery entry as a $24.00 (22A) never-lose entry (22B). The player-selected lottery numbers are shown at 22C to be "14-23-25-29-36-40." A printed ticket identifier 22D is generated by the lottery authority for tracking purposes described below, as is a date of purchase 22E for the ticket.

Figure 3A:
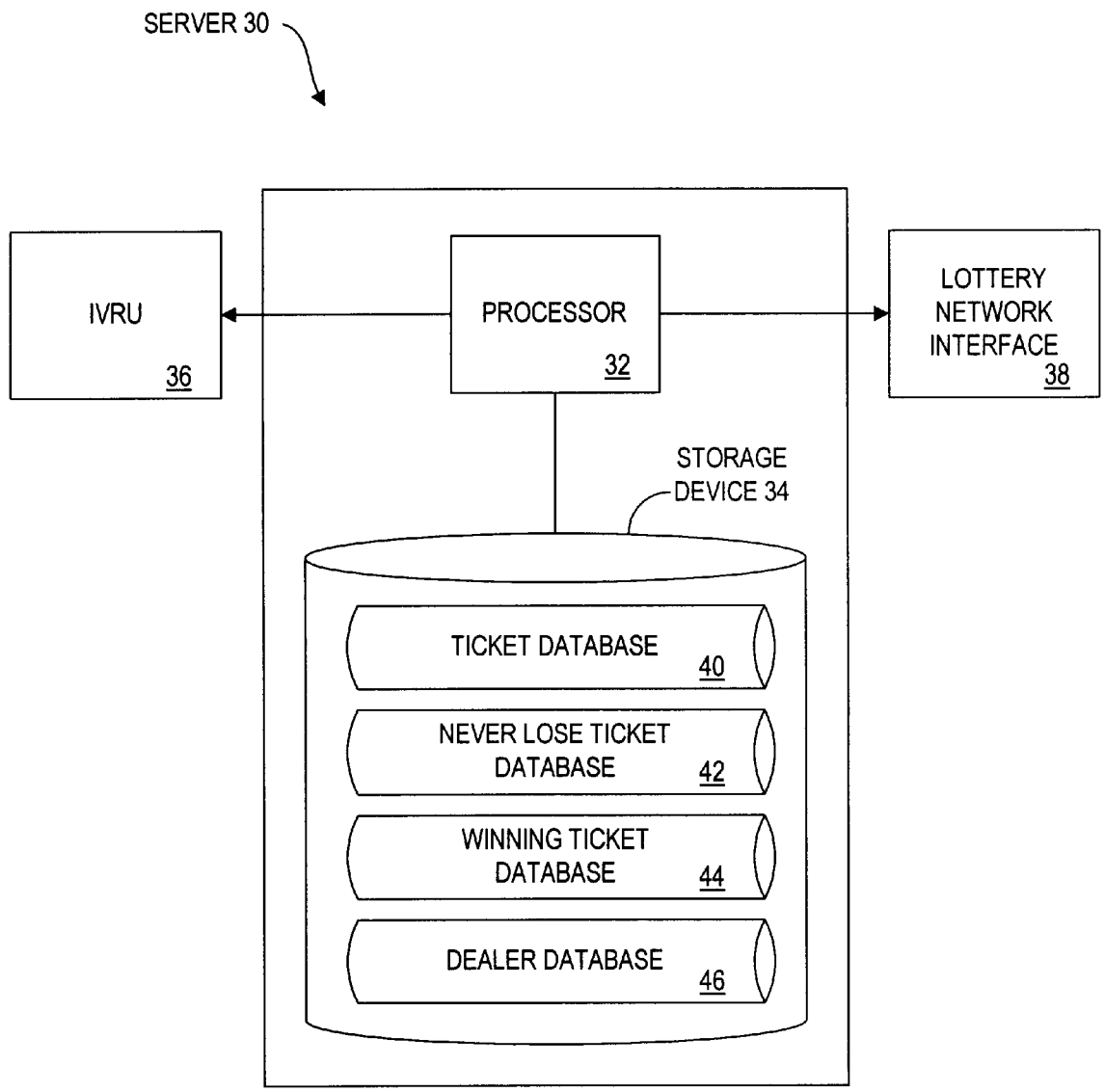
FIG. 3A is a diagrammatic view of a lottery authority server in accordance with the present invention.

Referring now to FIG. 3A, a server 30 comprises one embodiment of a computer server operable by a lottery authority for generating, validating, processing and redeeming lottery entries in accordance with the present invention. Server 30 includes a processor 32 connected to a storage device 34, to an interactive voice response unit (IVRU) 36, and to a lottery network interface 38. Storage device 34 includes four databases: a ticket database 40, a never lose ticket database 42, a winning ticket database 44, and a dealer database 46. Storage device 34 further includes the necessary software for operating server 30 in accordance with the processes described in detail herein.

Server 30 preferably comprises one of many conventional computer servers, for example an IBM RS6000®, programmed to operate in accordance with the present invention. Storage device 34 comprises an appropriate memory device, for example including an appropriate combination of semiconductor, magnetic, and optical memory. IVRU 36 comprises one of many well-known commercial units, for example AT&T's Conversant Voice Information System (VIS) operating on a hardware platform such as a MAP/100C system, while network interface 38 comprises standard network interface hardware and software.

Figure 3B:
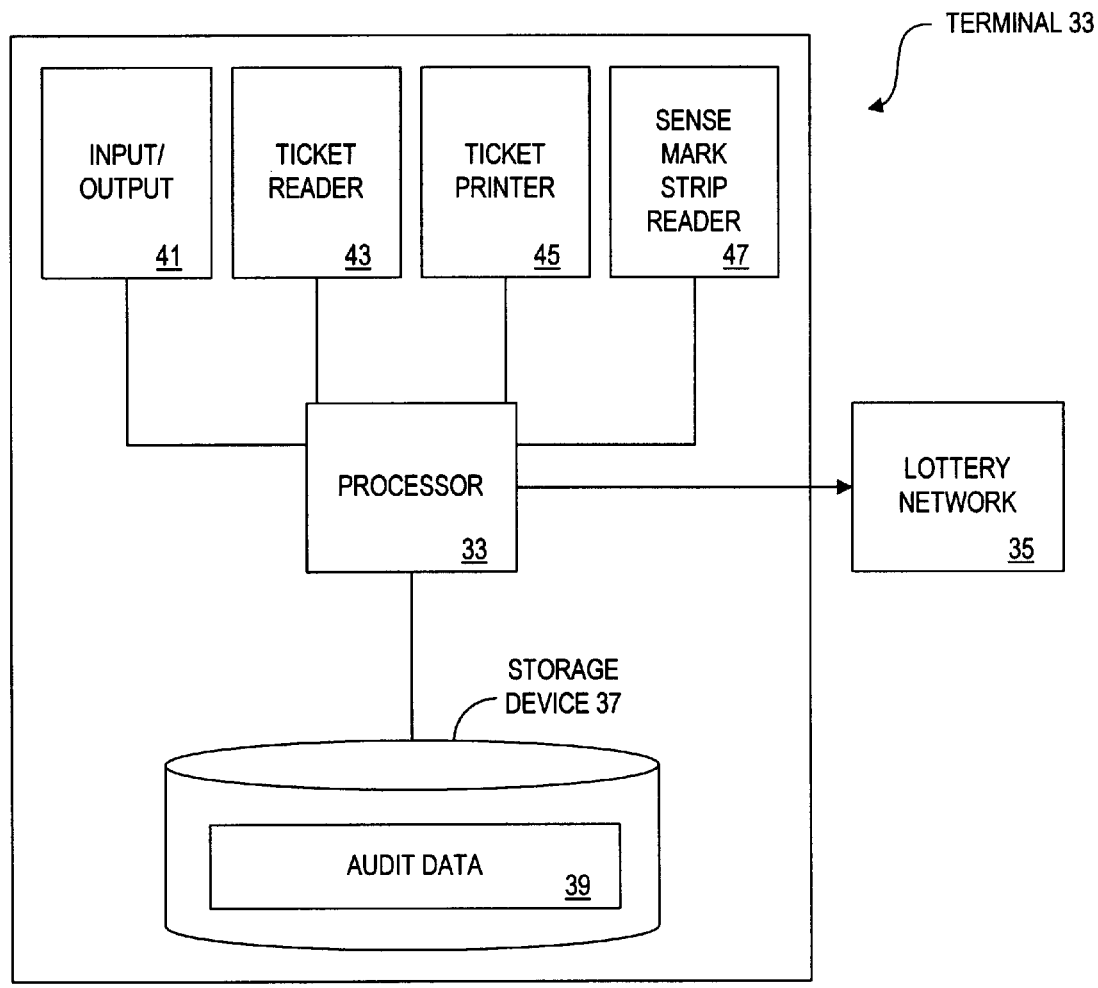
FIG. 3B is a diagrammatic view of a remote lottery terminal in accordance with the present invention.

With reference now to FIG. 3B, a local lottery terminal 31, of the type operated by a retail establishment as described above, is shown.

In contrast to server 30 described above, lottery terminal devices of the type such as lottery terminal 31 typically require less processing power, and are generally more 'terminal-like' in construction. More specifically, lottery terminal 31 is seen to include a processor 33, a lottery network interface 35, and a storage device 37. Processor 33 may comprise, for example, an Intel Pentium® compatible processor. Lottery network interface 35 comprises an appropriate network interface device, many of which are well known in the art. Storage device 37 comprises an appropriate memory device, for example including an appropriate combination of semiconductor, magnetic, and optical memory, and is seen to include an audit data database 39. Audit data database stores local sales data, for example including quantities and dollar volumes of ticket sales.

Lottery terminal 31 is seen to further include an input/output (I/O) device(s) 41, a lottery ticket reader 43, a ticket printer 45, and a sense mark form reader 47. I/O device 41 includes appropriate means for communicating data between a human operator and terminal 31, for example a video terminal and keyboard. Ticket printer 45 comprises a printer adapted to print lottery tickets, many of which are commercially available and well known in the art. Likewise, sense mark form reader 47 and lottery ticket reader 43 comprise commercially available units for reading data from completed sense mark forms and printed lottery tickets, respectively, many of which are well known in the art.

With reference to FIG. 4, ticket database 40 is seen to include five records 50A–E, each record including six fields of data pertinent to a ticket representing a lottery entry: a GAME TYPE field 52, a TICKET IDENTIFIER field 54, a NUMBERS SELECTED field 56, a DATE OF PURCHASE field 58, a NEXT DRAWING field 60, and a DEALER IDENTIFIER field 62. Game type field 52 identifies the type of game which the ticket corresponds to. It should be noted that different games may be stored in different databases. For example, the Lotto 6-49 ticket information may be stored in one database, while the Daily Numbers game (e.g. a pick three game) may be stored in another database. For the purposes of this application, the database described in FIG. 4 contains ticket information for a never-lose Lotto 6-49 game only.

Ticket identifier 54 represents a unique number generated by the lottery authority server (FIG. 3A) to both validate and track an entry. The numbers selected by the player are stored in field 56, while the date of purchase of the ticket is contained in field 58. Next drawing field 60 identifies the next drawing by date for which the entry will be active, while dealer identifier field 62 represents an identifier for the operator of the lottery terminal from which the entry was received.

With reference now to FIG. 5, never lose ticket database 42 includes five records 66A–E, each record including seven fields of data pertinent to a never-lose ticket representing an entry in a never-lose lottery. A GAME TYPE field 68, TICKET IDENTIFIER field 70, DATE OF PURCHASE field 72, NEXT DRAWING field 74, DEALER IDENTIFIER field 76, and NUMBERS SELECTED field 80, each include like information to like-named fields 52, 54, 58, 60, 62, 56 of ticket database 40, respectively. A STATUS field 78 includes data indicating if a ticket is "active," i.e. to be considered in a future drawing, or "closed," i.e. not to be considered in any future drawings. With reference now to FIG. 6, winning ticket database 44 includes four records 88A–D, each record including six fields of data pertinent to the winning status of a lottery ticket. It should be noted that in this embodiment, the winning ticket database 44 stores both conventional and never-lose winning ticket information. In other embodiments, there is a separate winning ticket database for never-lose tickets only. A GAME TYPE field 90, TICKET IDENTIFIER field 96, and NUMBERS SELECTED field 98, each includes like information to like-named fields 52, 54, and 56 of ticket database 40, respectively. A DRAWING DATE field 92 and NUMBERS DRAWN field 94 include the drawing date and drawn numbers of the winning drawing, respectively. A PRIZE field 100 indicates the prize awarded to each winning entry, the value of the prize of course being dependent on a host of factors including the game type, the jackpot for a particular game, and the number of matches between the numbers drawn and the entry numbers.

Referring now to FIG. 7, dealer database 46 is shown including four records 102A–D, each record including four fields. A DEALER IDENTIFIER field 104, an ADDRESS field 106, a TELEPHONE NUMBER field 108 and a NAME field 110 identify the operators of the various lottery terminals. Dealer identifier field 104 represents a unique index number assigned each dealer and/or each lottery terminal by the system, while the remaining fields are self-explanatory.

Process

Figure 8:
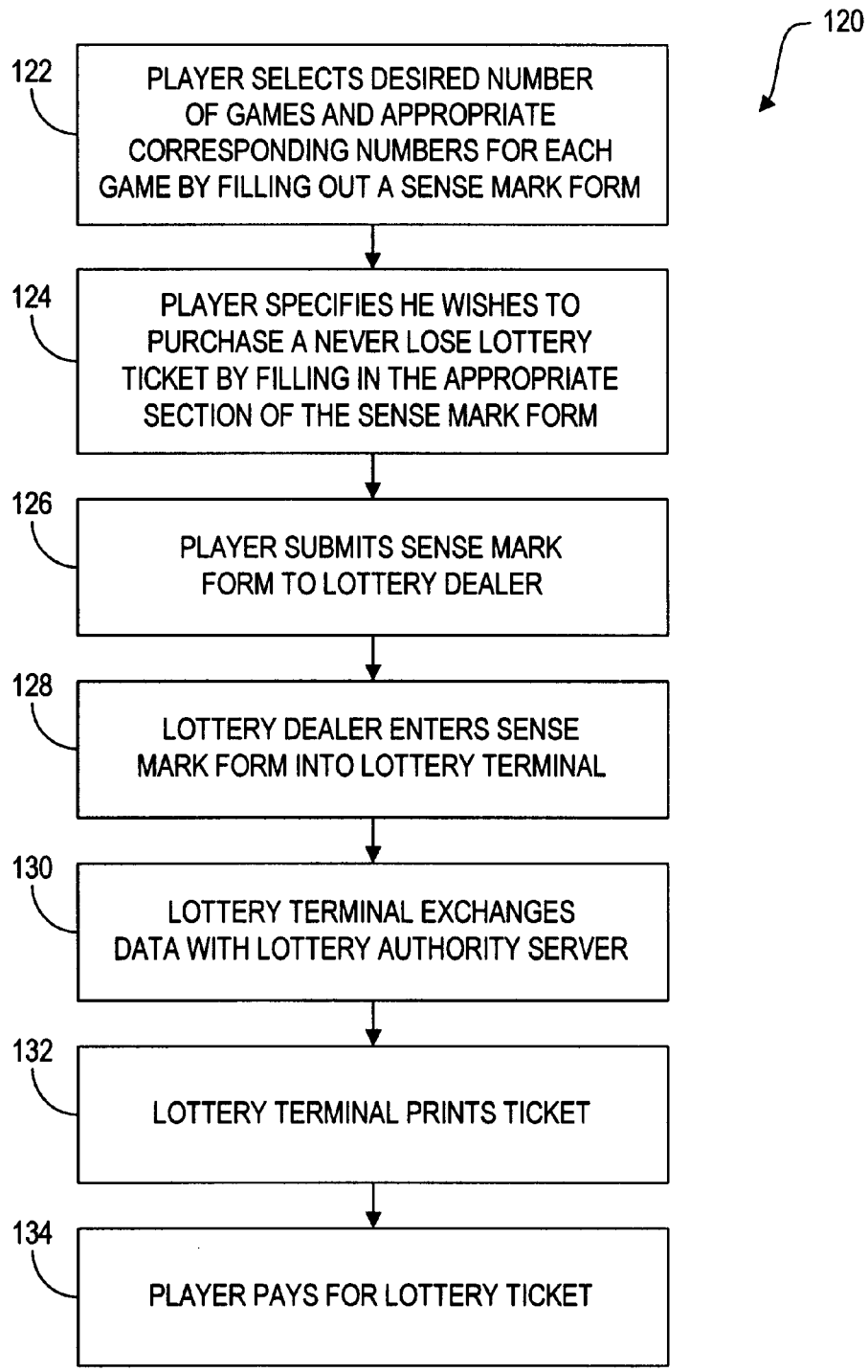
FIG. 8 is a flow chart illustrating an overview of a process of obtaining a lottery ticket in accordance with the present invention.

Referring now to FIG. 8, an overview process 120 is shown whereby a never-lose lottery ticket is purchased by a customer/player. To initiate the process, a player travels to a location operating a lottery terminal and obtains a sense mark form 20 of the type shown in FIG. 1. The player completes the bet slip, indicating the number of games to be played and the numbers selected for each game (step 122). In accordance with the invention, the player blackens the portion of the bet slip directed towards the never-lose option (step 124).

In an alternate embodiment, the player may request that the lottery authority randomly select numbers for his entry. Further, the never-lose lottery tickets may be purchased using a more specialized sense mark form, in lieu of the described form with the selectable option. The player would thus be presented with two lottery betting slips, one for obtaining conventional lottery tickets and one for obtaining never-lose tickets. Of course, embodiments negating the use of the bet slip are also apparent where, for example, the player enters his entry information directly into a user-operated lottery terminal or via the Internet.

Once the player has submitted his bet slip to the lottery terminal operator (step 126), the slip is entered into sense mark form reader 47 (step 128), and the data on the slip is communicated from terminal 31 to the central lottery authority server 30 shown in FIG. 3. Appropriate data is exchanged between the lottery terminal and the lottery server (step 130) whereby a ticket price is set, and the user entry is registered with and validated by the lottery server. Appropriate data is defined as at least the minimum amount of data required by the lottery authority to register and price a lottery entry or ticket. In the present embodiment, the appropriate data exchanged includes the number of games to be played, the numbers selected by the player corresponding to each game, the date of purchase of the ticket, and an indication that the entry is for a never-lose ticket. A lottery ticket of the type shown in FIG. 2 is printed at lottery terminal ticket printer 45 (step 132), and the ticket is provided to the player in exchange for the ticket price (step 134).

Figure 9:
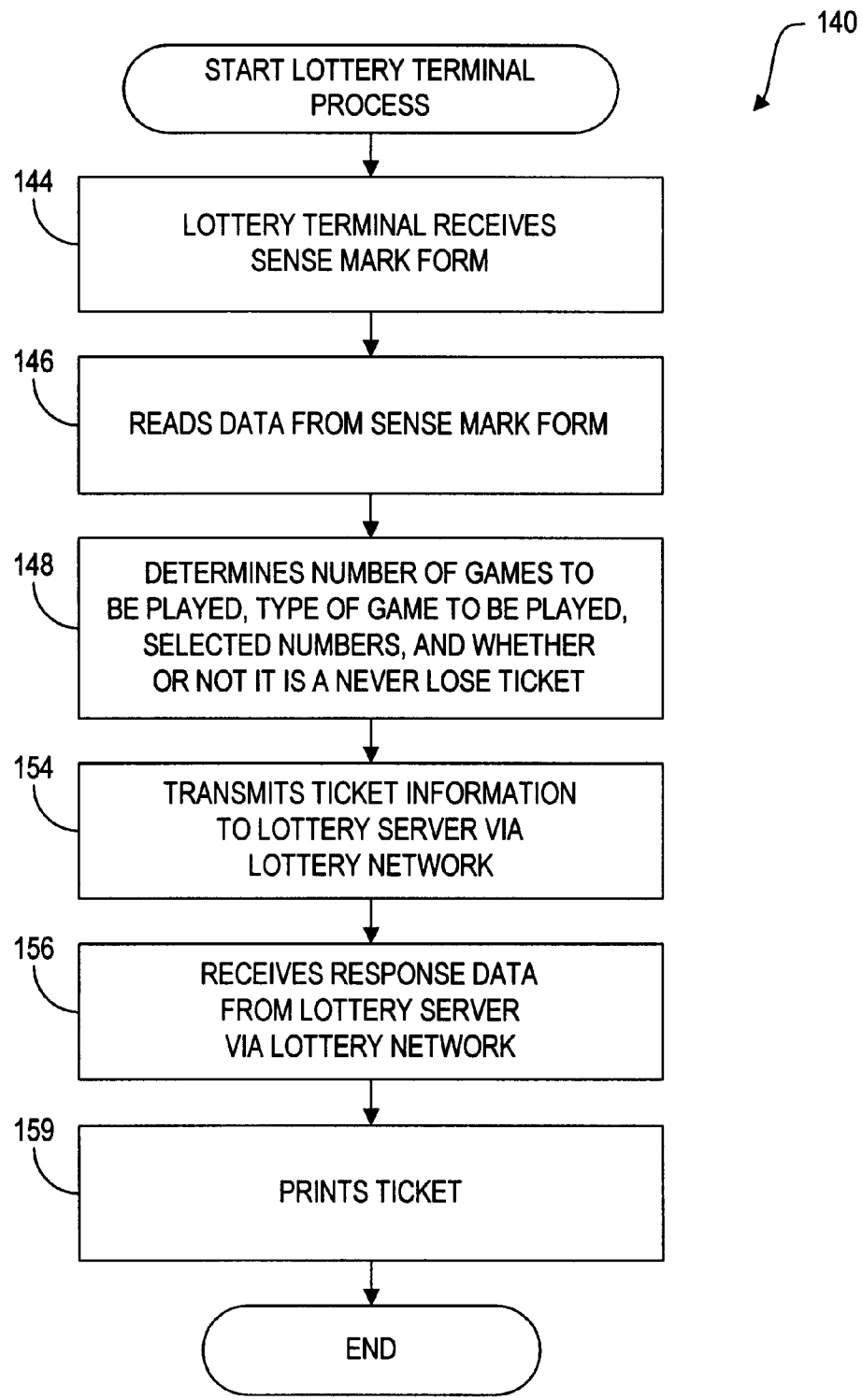
FIG. 9 is a flow chart illustrating a process of operating a lottery terminal to generate a ticket in accordance with the present invention.
Figure 10A:
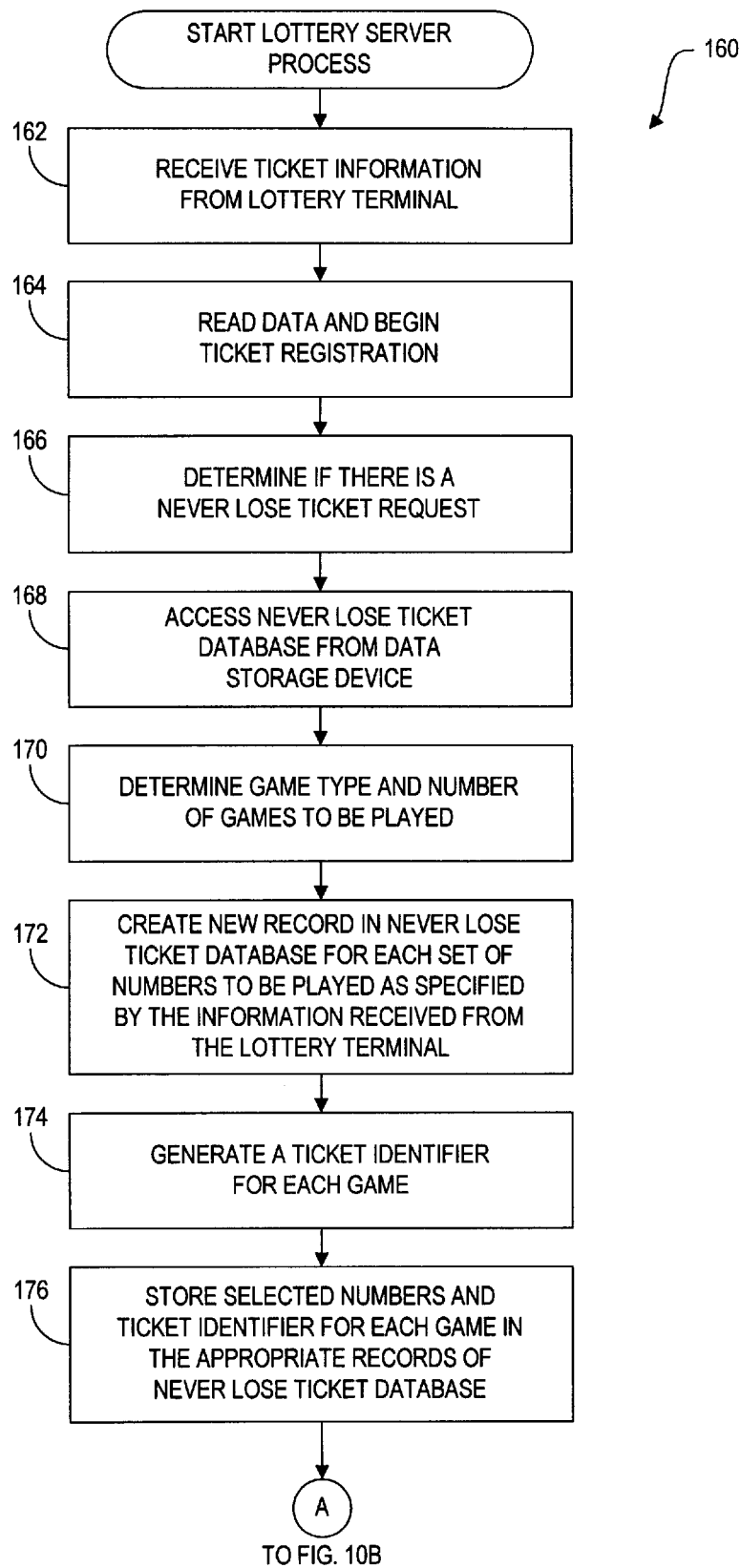
FIGS. 10A, B together show a flow chart illustrating a process by which a lottery authority server generates a lottery ticket entry/number in accordance with the present invention.
Figure 10B:
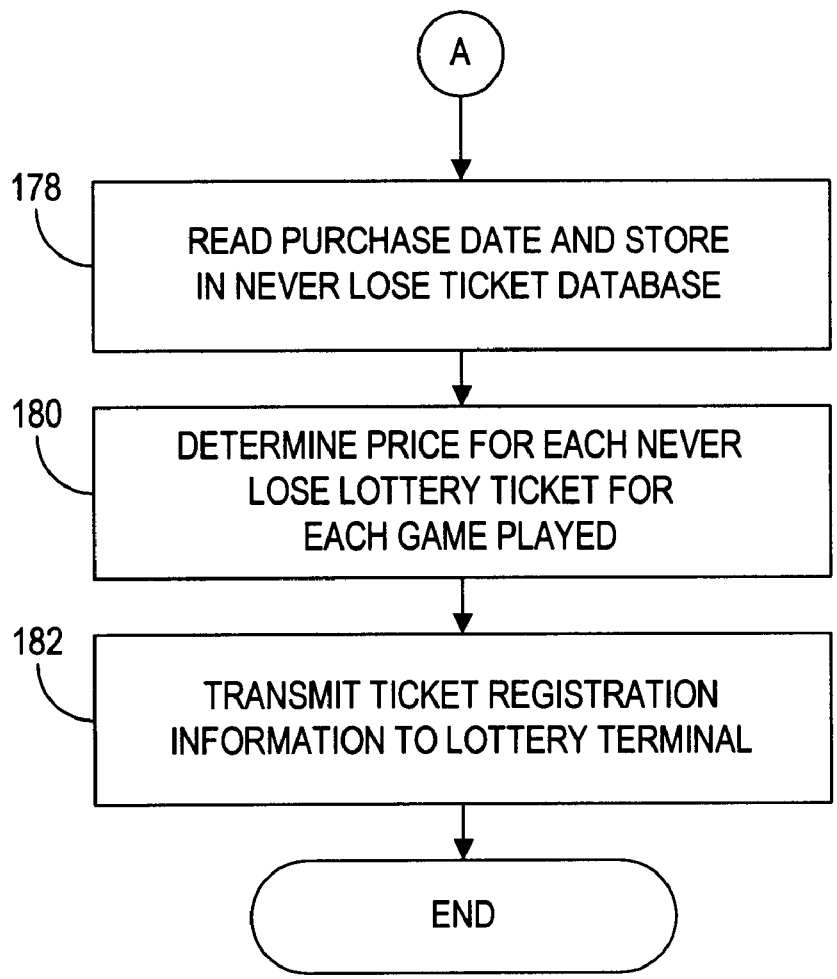

Referring now to FIGS. 9, 10A, and 10B a more detailed process is shown whereby lottery terminal 31 communicates with lottery server 30 to generate a valid, never-lose lottery ticket. Beginning with the process 140 of operation of the lottery terminal, the sense mark form is fed into and received by the reader (step 144), which reads the data encoded in the manner described above (step 146). In step 148, the terminal 31 determines the number of games to be played as specified by the data read from the bet slip in step 146. For each game to be played, terminal 31 determines the selected, or assigned (i.e. randomly selected by lottery authority server 30), lottery numbers. The ticket information is then transmitted over the lottery network for processing by lottery server 30 (step 154).

With reference now to FIG. 10A, a process 160 is shown whereby server 30 (FIG. 2) operates to process lottery entry data, calculate a price for a ticket(s), and transmit the price and validation data back to lottery terminal 31. More specifically, server 30 receives a transmission from lottery terminal 31 (step 162) which, based on the format of the data in the transmission, is determined to be a request for registration of a lottery entry (step 164).

In accordance with the present invention, server 30 processes the data to determine if the entry is for a never-lose ticket (step 166) and, if so, continues to process the received data for appropriate entry into never-lose ticket database 42 (FIG. 5) (step 168). More specifically, the incoming data is read to determine the number of games to be played, and the game type (step 170), and an appropriate record 66 is created in never-lose ticket database 42 for each game (step 172). A ticket identifier is generated for each game entry record 66 (step 174), and stored with that record in the database (step 176).

Referring to FIG. 10B, the purchase date is read from the data received from lottery terminal 31, and stored in the date of purchase field 72 in the appropriate record of never-lose ticket database 42 (step 178). A price is calculated for the particular game(s) entry(s) (step 180), the method of which is described herein below, and registration information is transmitted back to lottery terminal 31 (step 182). Registration information includes any relevant information corresponding to the information stored at the time of the ticket(s) purchase. In the present embodiment, the registration information includes the ticket identifier, the date of purchase, and the status of the ticket.

Referring back to FIG. 9, the data transmitted from the server 30 is received by lottery terminal 31 (step 156). The price of the lottery entry is collected by the operator of the lottery terminal, and to complete this portion of the operation of the lottery terminal, a lottery ticket 22 (FIG. 2) is printed at printer 45 for providing to the player (step 159).

Figure 11:
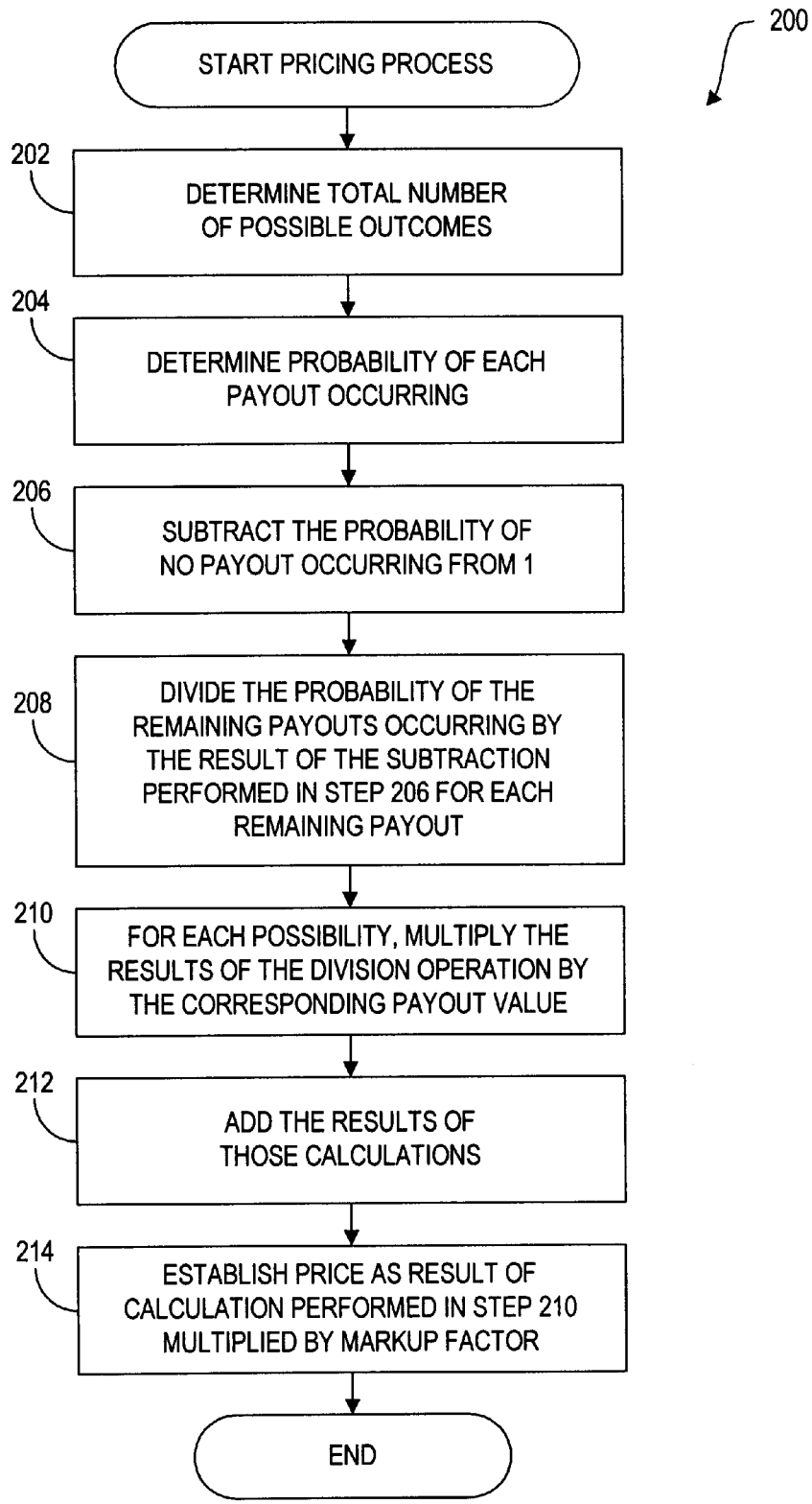
FIG. 11 is a flow chart illustrating a process of calculating a price for a lottery ticket in accordance with the present invention.

Referring now to FIG. 11, there is shown an exemplary process 200 for calculating the price of a never-lose lottery ticket. In the present embodiment, the formula used to calculate the price of such a ticket includes the following variables:

P=price of the never lose lottery ticket

M=markup added by the lottery authority

T=total number of possible unique outcomes

Prob $X_i$ = probability of a player achieving a certain outcome

Payout $X_i$ = the payout associated with a certain outcome

Prob Z = probability of a player not winning any prize

M is a percent markup included in the calculated ticket price so that the lottery derives a profit from the sale of never lose tickets. A markup factor of 1.5, for example, indicates that an additional 50% has been included in the base cost calculated below. T is the total number of unique outcomes, with a unique outcome representing a different payout. Prob $X_i$ is the probability value for each of the possible outcomes. For instance, if the probability of winning the top prize or jackpot is one in ten million, then the value of Prob $X_{jackpot}$ is 0.0000001. Payout $X_i$ is the respective amount of money awarded for each outcome. For example, the payout for matching 5 of 6 possible numbers may be $100,000. Prob Z represents the chance that the player receives no payout for that particular lottery draw. Since most tickets are losing tickets, this probability will generally be 80% or higher. An exemplary pricing equation implementing these variables is represented by the following mathematical equation:

$$\left[\sum_{i=1}^{T}\left(\left(\frac{ProbX_i}{1-ProbZ}\right)PayoutX_i\right)\right]M$$

It should be noted that the above equation is but one method of calculating the price of the never-lose lottery ticket. Those of ordinary skill in the art will understand that there are many other equations which would provide reasonable prices.

With reference now to FIG. 11, a process 200 for calculating the price for a never-lose lottery entry in accordance with the equation above is shown wherein server 30 determines the total number of possible outcomes (T) (step 202) and determines the probability (Prob $X_i$) of each outcome (step 204). Server 30 then subtracts the probability of no prize (Prob Z) from the integer 1 (step 206).

Continuing with the calculation of the price, server 30 divides Prob $X_i$ by (1-Prob Z) for each of the outcomes (step 208), and multiplies the result of the division operation of step 208 by Payout $X_i$ for each of the outcomes (step 210). Server 30 adds the result from the multiplication operation of step 210, for each of the (T) outcomes in step 202 (step 212), and rounds the result of the summation up or down to nearest whole number. The resulting number when multiplied by the markup factor, constitutes the price of a never-lose lottery ticket for that particular lottery game structure (step 214). Those of ordinary skill in the art will recognize that this calculation determines the expected value of the ticket with the addition of a mark-up factor, ignoring the time value of money.

The following is an illustrative example of the pricing process 200 for a never lose lottery ticket entry in a one million dollar top prize, 6–49 game. In this example, there are six possible outcomes. Each outcome has a corresponding payout or prize, with two matches or less resulting in a payout of zero. The "5 of 6+" outcome represents a player entry matching five of the six numbers correctly as well as a bonus number. For example, suppose the regular numbers drawn are 12, 15, 21, 32, 42, and 48 and the bonus number drawn is 44. If the player numbers match five out of the six possible drawn numbers correctly, 12, 15, 32, 42, and 48, and also match the drawn bonus number, 44, then the player wins the second prize.

Example 1—Lotto 6–49

Top Jackpot—$1,000,000

| $X_i$ | Outcome | Payout ($) | Prob ($X_i$) | Prob (Z) | 1-Prob (Z) | Payout $(X_i)^*$ [prob $X_i$/(1-prob Z)] |
|---|---|---|---|---|---|---|
| $X_1$ | 6 OF 6 | $1,000,000 | 0.0000001 | 0.981469 | 0.018531 | $5.40 |
| $X_2$ | 5 OF 6+ | $100,000 | 0.0000004 | 0.981469 | 0.018531 | $2.16 |
| $X_3$ | 5 OF 6 | $1,000 | 0.0000180 | 0.981469 | 0.018531 | $0.97 |
| $X_4$ | 4 OF 6 | $100 | 0.0009690 | 0.981469 | 0.018531 | $5.23 |
| $X_5$ | 3 OF 6 | $2 | 0.0175440 | 0.981469 | 0.018531 | $1.89 |
| $X_6$ | 0–2 OF 6 | $0 | 0.9814690 | 0.981469 | 0.018531 | $0.00 |
| TOTAL: | | | 1.0000000 | | | $15.65 |

For the exemplary one million dollar top prize 6–49 game set out in example 1 of the table above, the price of the never-lose ticket (before markup) is calculated to be $15.65. This is the expected value of the ticket, representing the average return to the player given a large number of ticket purchases. The lottery would then use an appropriate markup (M) to build a profit margin into the ticket price. They could, for example, mark up all tickets by fifty percent so that the resulting price is $23.48 ($15.65×1.5). This price may then be rounded up to the nearest whole dollar amount.

It should be noted that different prize structures and probabilities may yield higher or lower prices for each never-lose lottery game structure. Thus, a 6/45 game with the same prize structure would have a different ticket price due to the different probability values associated with each possible outcome.

In Example 2 set out below, the top prize has been changed to ten million dollars, with the remaining parameters otherwise identical to Example 1 set out above. The resulting price is seen to be calculated at $64.22 (before markup) as illustrated below.

Example 2—Lotto 6–49
Top Jackpot—$10,000,000

| $X_i$ | Outcome | Payout ($) | Prob ($X_i$) | Prob (Z) | 1-Prob (Z) | Payout ($X_i$)*<br>[prob $X_i$/(1-prob Z)] |
|---|---|---|---|---|---|---|
| $X_1$ | 6 OF 6 | $10,000,000 | 0.0000001 | 0.981469 | 0.018531 | $53.96 |
| $X_2$ | 5 OF 6+ | $100,000 | 0.0000004 | 0.981469 | 0.018531 | $2.16 |
| $X_3$ | 5 OF 6 | $1,000 | 0.0000180 | 0.981469 | 0.018531 | $0.97 |
| $X_4$ | 4 OF 6 | $100 | 0.0009690 | 0.981469 | 0.018531 | $5.23 |
| $X_5$ | 3 OF 6 | $2 | 0.0175440 | 0.981469 | 0.018531 | $1.89 |
| $X_6$ | 0–2 OF 6 | $0 | 0.9814690 | 0.981469 | 0.018531 | $0.00 |
| TOTAL: | | | 1.0000000 | | | $64.22 |

Examples one and two above show typical fixed jackpot amounts. Most lottery jackpots, however, increase when the top payout is not won. The operating lottery authority may offer the never-lose option when the jackpot is at low amounts only, for the purpose of stimulating ticket sales.

It will be apparent from a consideration of the examples above that the price of a never-lose lottery ticket could substantially exceed the price of a conventional lottery ticket. Therefor, it may be desirable in some embodiments to decrease the up-front cost to the player, for example by spreading the cost of the ticket over a number of payments. In such an embodiment, the expected value of the ticket is calculated as described above, billing costs (if any) are added, and the total cost of the ticket is billed in periodic statements to the player. Such periodic billing may be applied to a credit card account, or may be implemented by automatic deductions from a savings or checking account identified by the player.

In an alternate billing arrangement, the player pays a conventional price for each drawing for which the never-lose ticket is entered. The fees and entry terminal upon a winning drawing. The price may be billed as described above to a credit card or other periodic payment mechanism. The valid status of the never-lose ticket may be cancelled if the payment mechanism is disabled or becomes invalid; i.e. if a payment account is terminated by the player. Theoretically, the calculated price of this alternate billing arrangement is the same as the calculated prices described in the examples above.

In an alternate method of calculating a price, the lottery authority could determine an average top prize for a given time period (e.g. one year), and calculate a single, uniform price for a never-lose ticket based on that average top prize. The uniform price would then be used for all ticket sales in lieu of an individually calculated price for each ticket. As an example, if the lottery authority determined that the top jackpot averaged five million dollars over the past year, then the price for all never-lose lottery tickets would be calculated once, in the manner described above, using five million dollars as the top prize.

Yet another method for operating a never-lose lottery having fixed price tickets is to offer a fixed top jackpot. Players purchasing never-lose tickets would thus only be eligible to win this predetermined amount if they win the top prize. The jackpot for never-lose players would remain constant from drawing to drawing, regardless of whether the top prize were paid out. All never-lose entries would remain active until each won a drawing-based prize, but the top prize or jackpot would remain a fixed amount and not increase over time.

In embodiments where the top prize for never-lose ticket holders is different from that of conventional ticket holders, the lottery operator could offer an insurance upsell where the difference between the jackpot amount and the top prize amount available to the ticket holder is paid should the ticket holder match the maximum number of selections correctly.

It is noted that top payouts are often split among multiple lottery winners. This shared top payout fixes the cost of jackpot payouts by the lottery authorities because they pay the same amount of money regardless of the number of winners. While not described in any of the examples above, this element of the lottery prize structure would be considered when determining a fair and accurate price for each never-lose ticket.

While the above pricing equation incorporates a fixed percentage markup for the lottery, there are many other ways in which a markup may be calculated. For example, the lottery could calculate the average number of entries to be sold before a prize is won. This average number of entries is then multiplied by the margin associated with individual lottery ticket sales. For example, most lotteries today operate with a 100% markup on each ticket sold, that is prizes returned typically average half of the purchase price. A lottery offering a never-lose ticket might calculate that it takes ten entries on average to win a prize. To determine the appropriate markup on the never-lose ticket, the lottery authority would multiply a $0.50 markup on a one dollar ticket by ten, and markup the never lose ticket by $5.00.

In yet another embodiment, the lottery assigns a number that equates to less than the average margin on normal ticket sales due to the increased volume as a result of the never-lose option.

It will be understood that numerous other methods for pricing never-lose lottery tickets will be readily apparent to those skilled in the art.

Figure 12A:
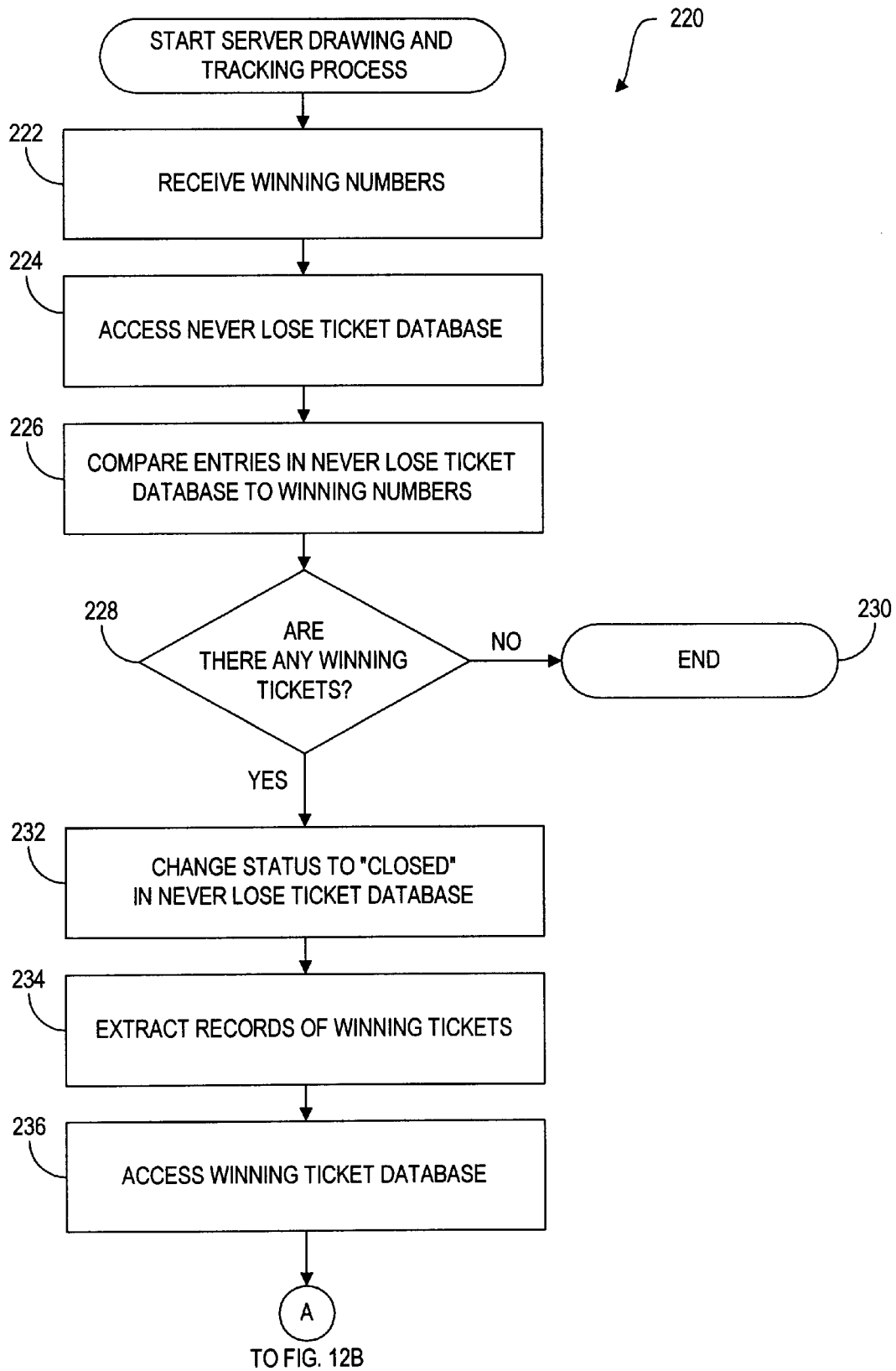
FIGS. 12A, B together show a flow chart illustrating a process of identifying winning lottery entries in accordance with the present invention.
Figure 12B:
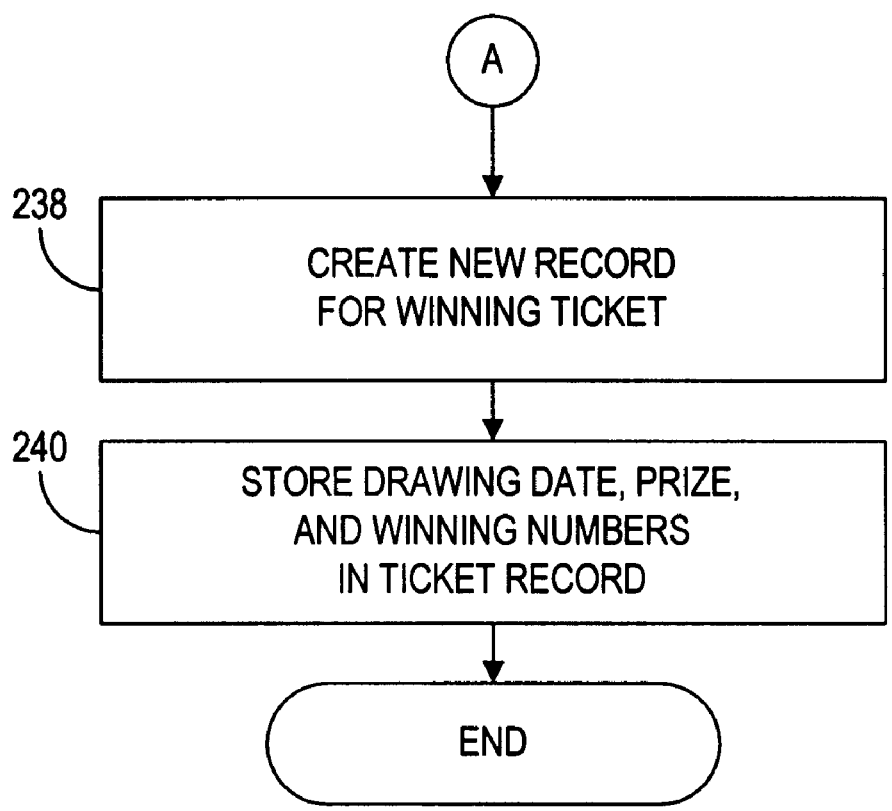

With reference now to FIGS. 12A, B, there is described a method 220 for searching never-lose ticket database 42 (FIG. 5) to identify winning tickets, and to store the records associated with those tickets in winning ticket database 44 (FIG. 6).

More specifically, the winning numbers are received by server 30 (step 222) following a lottery drawing. Such a drawing may be accomplished in one of many known ways, typically including the use of a random number generator which may be electrical or mechanical in form. Such random number generators are known to include, for example, hand drawings of numbers, mechanical operations to identify numbers, and electrical random number generators. The winning numbers may also be generated by an electronic random number generator operated in or by server 30.

It will be understood that the quantity of winning numbers will be a function of the type of game being played. Some games may require the drawing of multiple numbers to identify corresponding multiple classes of winners. In the 6/49 game described herein, a player selects six numbers, each ranging from one to forty-nine. A drawing is conducted twice a week, each drawing identifying six winning numbers in the same one to forty-nine range. Other variations exist where the quantity of numbers selected by the player is less than or more than six, and the pool of numbers from which they are chosen is greater than or less than forty-nine.

Once the winning numbers have been entered into server 30, ticket database 40 is searched to determine if there are any winning entries. Never-lose ticket database 42 is then read to determine if there are any winning never-lose entries. This reading is accomplished by first accessing the database (step 224) and then comparing the NUMBERS SELECTED field 80 to the winning numbers (step 226), whereby any winning entries are identified (step 228). If no winning entries are identified, access to the never-lose ticket database is terminated (step 230).

If a winning entry (i.e. an entry having three or more matches with the drawn numbers) is identified in never-lose ticket database 42, the data in status field 78 of the record 66 identifying the winning entry is changed to "closed" (step 232). The winning record 66 data is extracted from never-lose ticket database 42 (step 234) and, after appropriately accessing winning ticket database 44 (step 236), a new record 88 is created in the latter database (step 238). The winning entry data is stored in the newly created winning ticket database 44 record (step 240) to complete the processing of the winning entry. It will be appreciated that, while a preferred embodiment has been shown and described for processing never-lose entries to identify winning entries, many other embodiments having functionally similar results will be apparent to those skilled in the art.

Figure 13A:
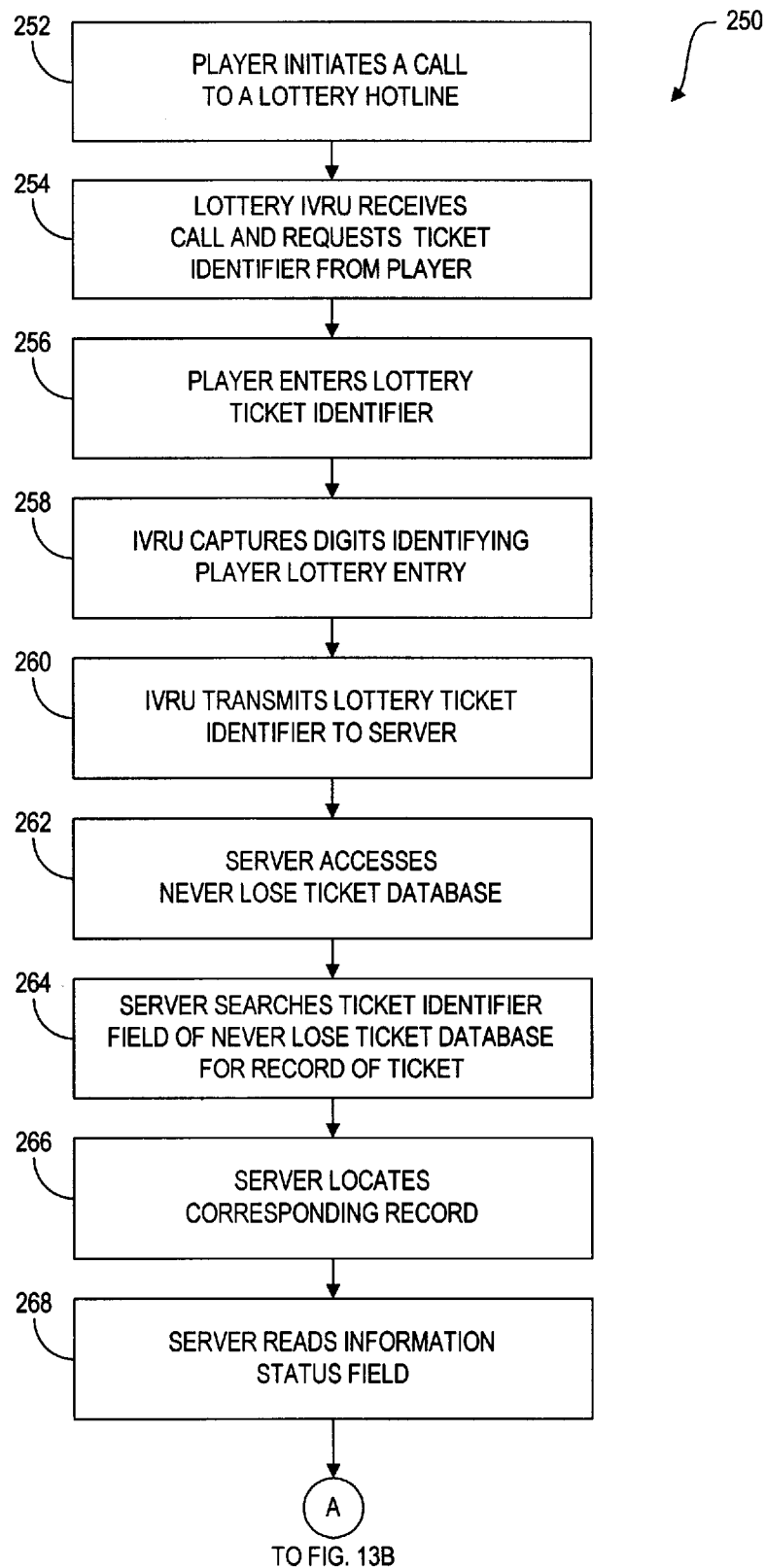
FIGS. 13A, B together show a flow chart illustrating a process by which a player can query the status of a lottery entry in accordance with the present invention.
Figure 13B:
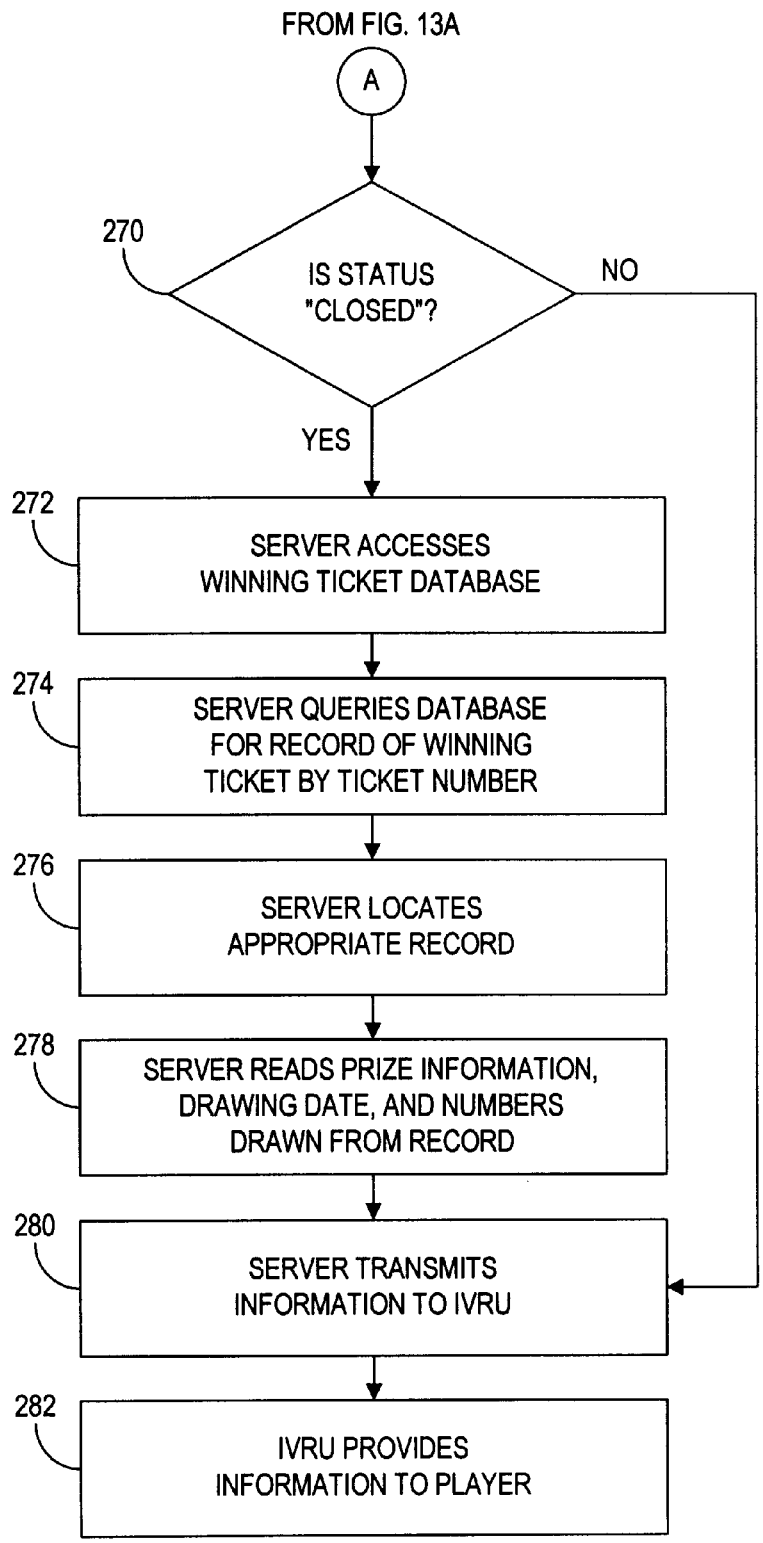

With reference now to FIGS. 13A, B, in accordance with the present invention a process 250 is shown whereby a holder of a never-lose lottery ticket may obtain the status of that ticket via telephone.

Describing now FIG. 13A, a player initiates a telephone call to a lottery 'hotline,' (step 252), that is a telephone number established by the lottery authority whereby a player can check the status of a never-lose lottery ticket. Interactive voice response unit (IVRU) 36 receives the incoming telephone call, and recites a verbal instruction for the caller to enter a ticket identifier (step 254). The use of IVRUs, and the scripts to operate and control same, are well known to those skilled in the art. Similarly, the description presented herein of handling an incoming call will be understood by those skilled in the art. Various components associated with call processing and handling, such as private branch exchanges (PBX), automatic call distributors (ACD), data buses, and switches, may be included and will be understood by those skilled in the art. Such methods and components for call handling are well known in the art and need not be described herein.

Upon entry by the caller of the digits representing the lottery ticket identifier (step 256), the IVRU captures same (step 258) and transmits the ticket identifier to server 30 (step 260). Server 30 accesses never-lose ticket database 42 (step 262) and queries the data in field 70 of same (step 264) to identify any matching record 66 (step 266). If no matching record exists, an appropriate message is recited to the caller through the IVRU, and re-entry of another ticket number may be requested. If a matching record 66 is found, the data in status field 78 is read (step 268) to determine the status of the entry (step 270). If the status is read as "active," the server 30 directs the IVRU (step 280) to recite a message (step 282) indicating that the ticket is still active.

If the status check done with respect to step 270 indicates that the status is "closed," then winning ticket database 44 is accessed (step 272) and field 96 is read (step 274) to identify the matching record (step 276), i.e. the record containing data identifying the winning ticket. Appropriate information, including the winning numbers, the drawing date, and the prize information are read (step 278) and transmitted to the IVRU (step 280) for reciting to the caller/player (step 282).

Figure 14:
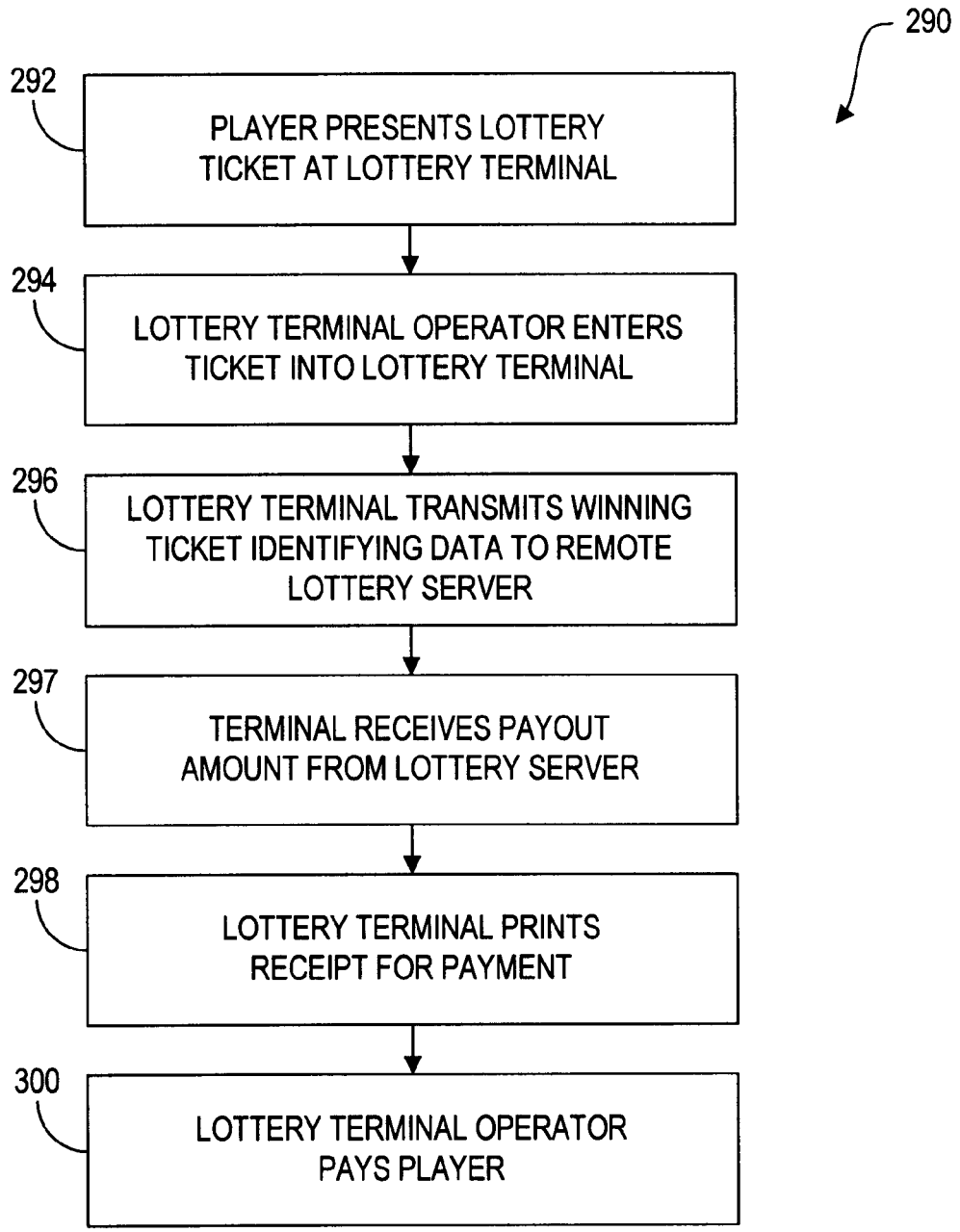
FIG. 14 is a flow chart illustrating an overview of a process for cashing in a winning lottery ticket to receive a prize in accordance with the present invention.

Referring now to FIG. 14, a process 290 comprises an overview of a method whereby a player may collect a prize for a winning never-lose lottery ticket from a lottery terminal operator, a process commonly referred to as redeeming a winning lottery ticket. In accordance with the process, the player presents the winning lottery ticket for payment by a lottery terminal operator, or any other lottery dealer authorized by the lottery authority to cash in winning tickets (step 292). It will be understood that the value of the prize may determine the location and/or the dealer at which the prize can be redeemed.

On receipt of the winning lottery ticket, the operator enters the ticket into ticket reader 43 attached to lottery terminal 31 (step 294). Appropriate data, for example, the ticket identifier, is transmitted to remote lottery server 30 (step 296). The lottery server transmits back the payout amount (step 297), which the lottery terminal uses to print a payment receipt (step 298). The lottery terminal operator then pays the winning amount to the player (step 300). Details of the process practiced by the lottery terminal are shown in FIG. 15, while details of the operation of server 30 are shown in FIGS. 16A, B, each of which is described herein below.

Figure 15:
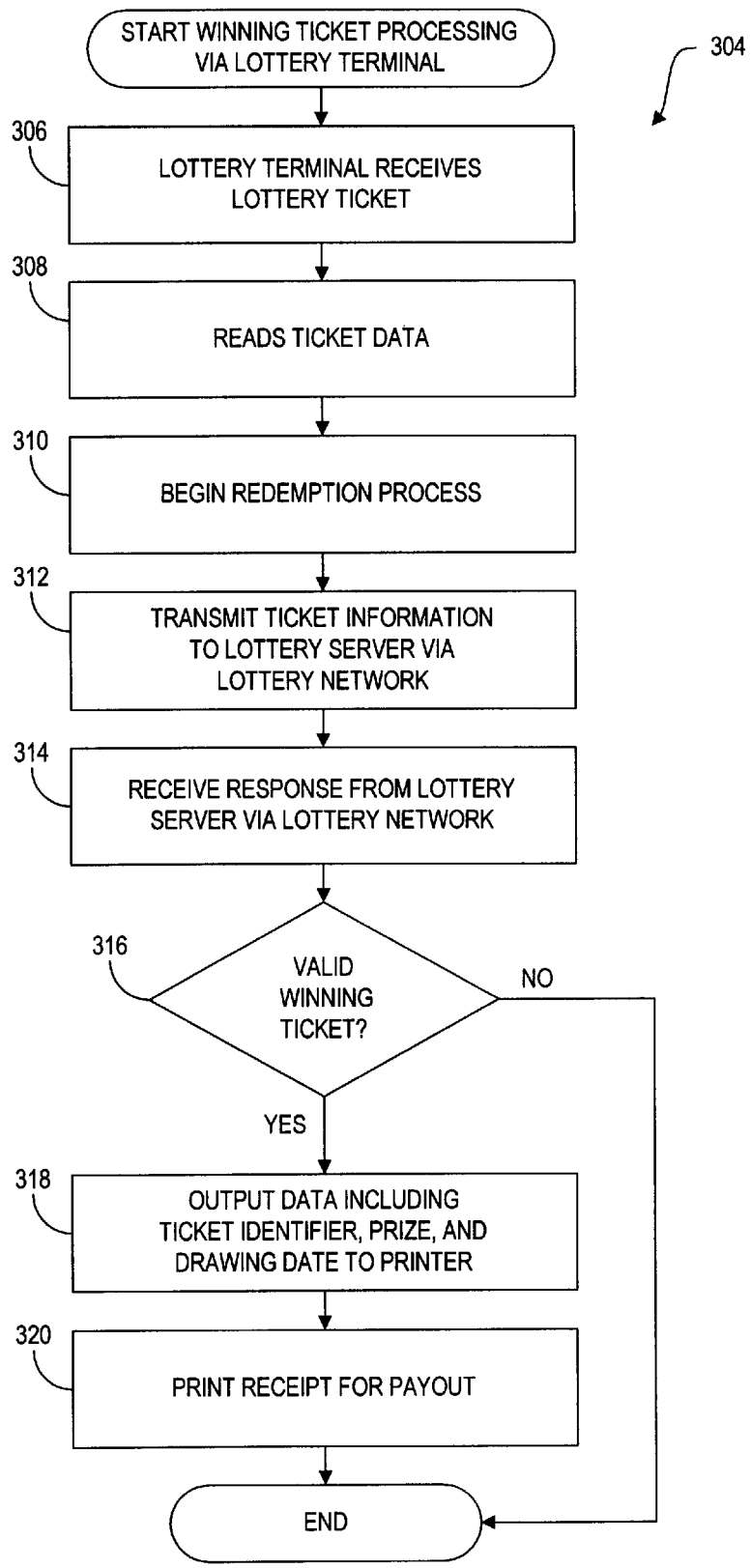
FIG. 15 is a flow chart illustrating a process of operating a lottery terminal to process a winning lottery ticket in accordance with the present invention.

With reference now to FIG. 15, a process 304 is shown whereby lottery terminal 31 processes a winning, never-lose lottery ticket. In accordance with process 304, an apparently winning, never-lose lottery ticket is placed into ticket reader 43 of the terminal (step 306), from which lottery ticket information is retrieved (step 308). Input is provided to the terminal by an operator through I/O device 41 that the ticket is to be verified as a winning ticket (step 310). Subsequently, the ticket information including the ticket number is transmitted to lottery server for verification as a winning ticket (step 312).

Figure 16A:
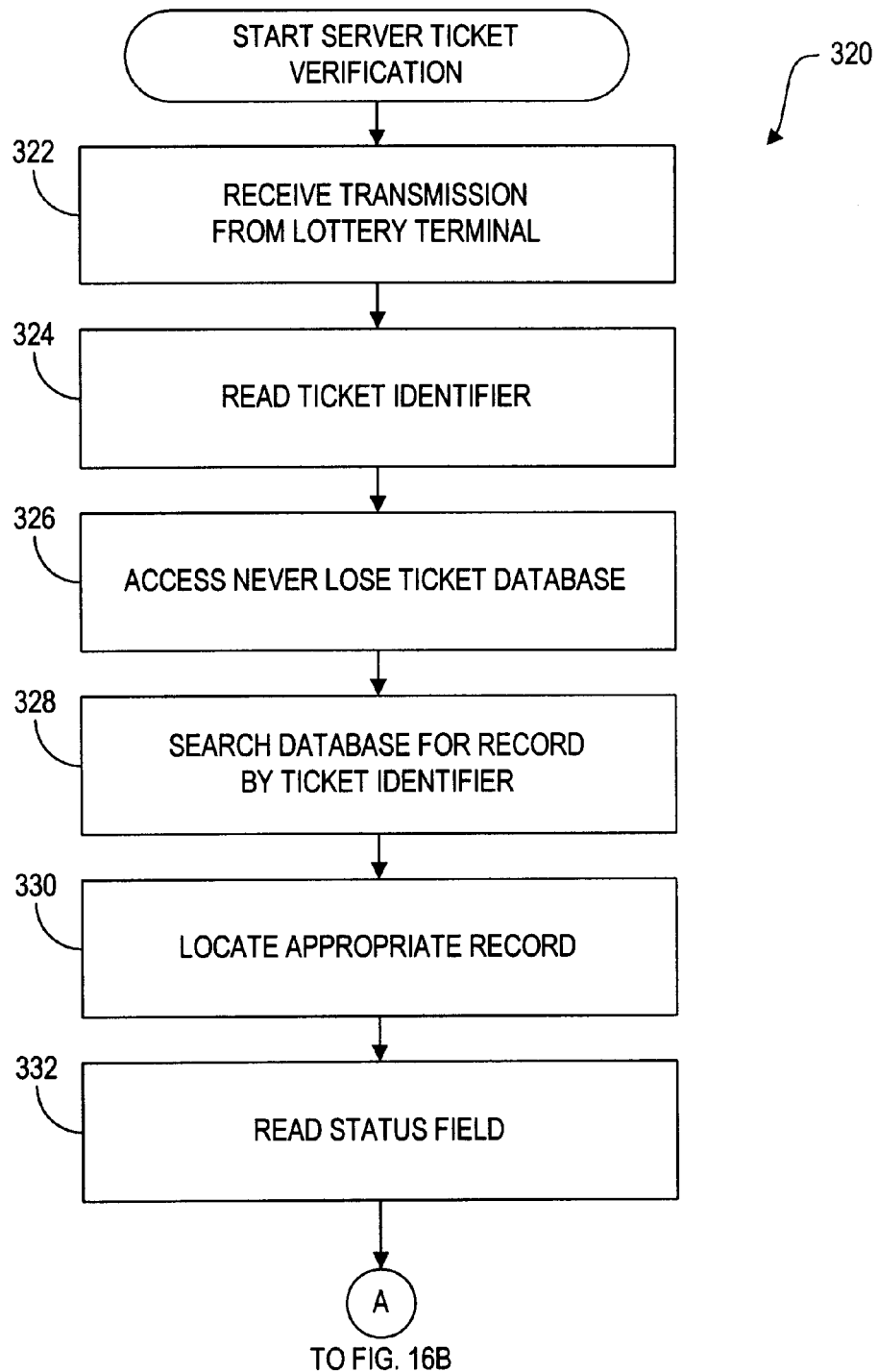
FIGS. 16A, B together show a flow chart illustrating a method by which a lottery authority server processes a winning lottery ticket in accordance with the present invention.
Figure 16B:
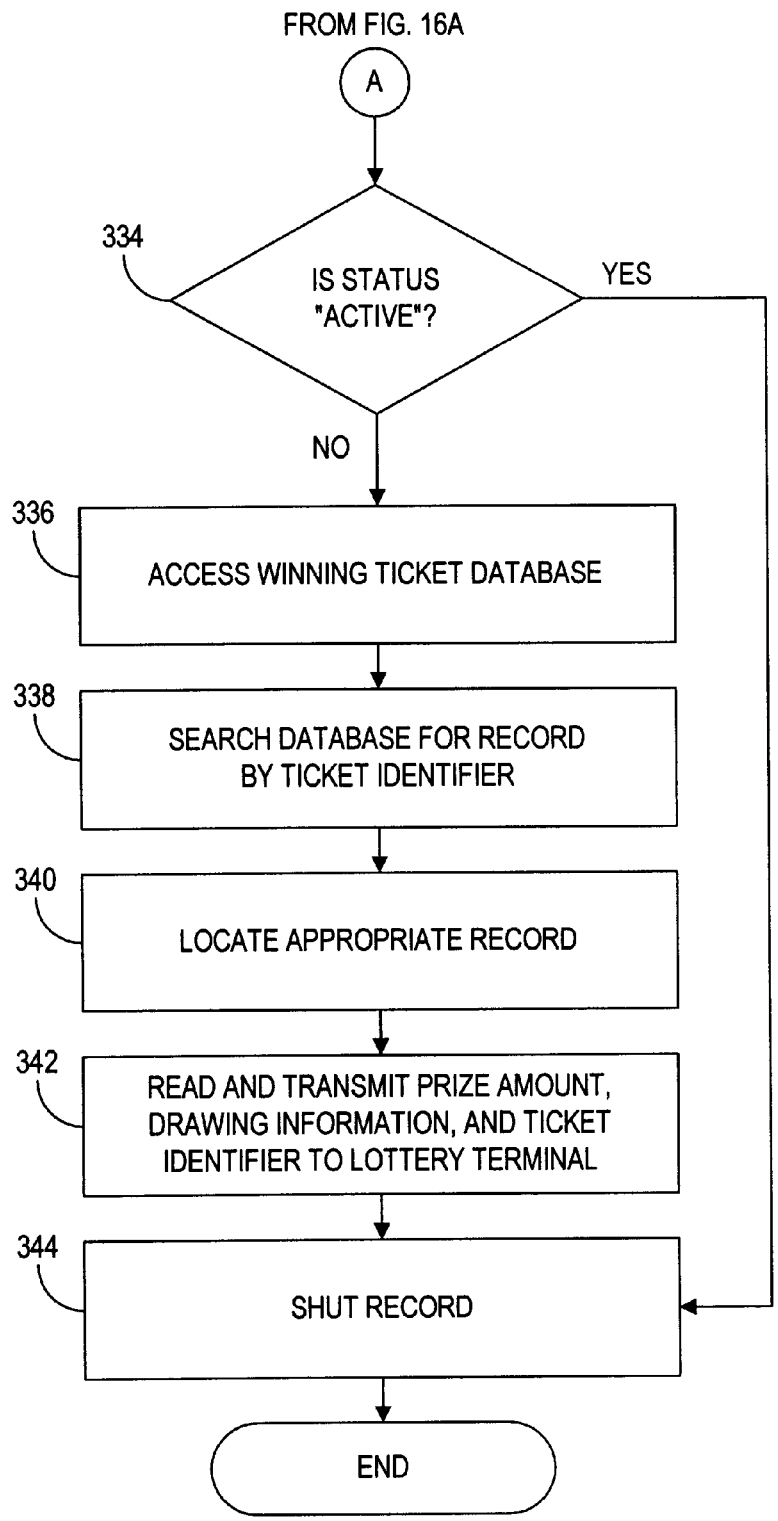

Referring now to FIGS. 16A and B, a process 320 is shown whereby server 30 operates to verify the winning status of a ticket. More specifically, server 30 receives the data transmission from the lottery terminal (step 322), reads the received ticket identifier (step 324), and searches never-lose ticket database 42 (step 326) to find the record 66 containing data in field 70 that matches the received ticket identifier (steps 328, 330). The data in status field 78 is read (step 332) to verify that it is "closed," indicating a winning ticket. If the status indicates the never-lose ticket is "active" (step 334), the record is shut (step 344) and the ticket owner is informed that the ticket is still active, i.e. has not yet won a prize.

If the status in field 78 indicates the expected status of "closed," winning ticket database 44 is accessed (step 336) and the contents of field 96 queried (step 338) to identify the record 88 having the matching ticket identifier (step 340). The prize amount, drawing information (i.e. drawing date and game type) and ticket identifier are read from the identified winning ticket record, and transmitted back to the lottery terminal (step 342). The winning record is subsequently shut (step 344) and access to the winning ticket database is terminated.

Referring back again to FIG. 15, the response from lottery server 30 is received by the lottery terminal (step 314) and examined to determine if the ticket is a valid winning ticket (step 316). If the ticket is not a winning ticket, the owner is appropriately notified and this lottery terminal process terminates. If the information received from the lottery server indicates the ticket is valid and winning, then data including the ticket number, drawing date, and prize value is output to the printer (step 318) for printing on a receipt (step 320).

There has thus been described a new and improved apparatus and process for operating a lottery to generate, price, sell, process and redeem never-lose lottery tickets. The invention provides significant advantages in the field of lotteries, including simplifying the purchase process while increasing the desirability of the tickets to the players. The invention has particular applicability in the field of state-run lotteries having authorized, distributed lottery dealers operating lottery terminals in communication with a centralized server operated by a lottery authority.

While the present invention has been described with respect to specific embodiments, it is not thus limited. Numerous modifications, improvements, and changes will be apparent to those skilled in the art and which fall within the spirit and scope of the invention.

What is claimed is:

1. A method of operating a lottery, comprising:
   (a) receiving a result of a lottery drawing;
   (b) comparing said result to a plurality of stored lottery entries;
   (c) if said result corresponds to one of said plurality of stored lottery entries, identifying said one entry as a winning lottery entry;
   (d) identifying a first lottery entry of said plurality of stored lottery entries as a non-winning lottery entry;
   (e) repeating said steps (a), (b), (c) and (d) for subsequent lottery drawings until said first lottery entry is identified as a winning lottery entry; and
   (f) after said first lottery entry is identified as a winning lottery entry, arranging for said first lottery entry to not be included in subsequent lottery drawings.

2. The method of claim 1, further including storing with each of said plurality of stored lottery entries a status, said status indicating whether the lottery entry is active or inactive.

3. The method of claim 2, wherein said active status indicates a non-winning lottery entry eligible for entry into subsequent lottery drawings, and said inactive status indicates a winning lottery entry ineligible for entry into subsequent lottery drawings.

4. The method of claim 1, further including storing with each winning lottery entry a winning date and a prize value.

5. The method of claim 1, wherein said winning lottery entry includes a lottery number selected by a player.

6. The method of claim 1, wherein said winning lottery entry includes a lottery number selected by a lottery authority.

7. An apparatus for operating a lottery, comprising:
   a processor;
   a memory connected to said processor, said memory storing
      a result of a lottery drawing, and
      a plurality of stored lottery entries;
   said processor operative to
      (a) identify, if said result corresponds to one of said plurality of stored lottery entries, said one of said plurality of stored lottery entries as a winning lottery entry,
      (b) identify a first lottery entry of said plurality of stored entries as a non-winning lottery entry,
      (c) repeat operations (a) and (b) for results of subsequent lottery drawings until said first lottery entry is identified as a winning lottery entry, and
      (d) after said first lottery entry is identified as a winning lottery entry, arranging for said first lottery entry to not be included in subsequent lottery drawings.

8. The apparatus of claim 7, wherein said processor is further operative to store with each of said plurality of stored lottery entries a status, said status indicating whether a lottery entry is active or inactive.

9. The apparatus of claim 8, wherein said active status indicates a non-winning lottery entry eligible for entry into subsequent lottery drawings, and said inactive status indicates a winning lottery entry ineligible for entry into subsequent lottery drawings.

10. The apparatus of claim 7, wherein said processor is further operative to store with each winning lottery entry a winning date and a prize value.

11. The apparatus of claim 7, wherein said lottery entry includes a lottery number selected by a player.

12. The apparatus of claim 7, wherein said lottery entry includes a lottery number selected by a lottery authority.

13. An apparatus for operating a lottery, comprising:
    first means for receiving a result of a lottery drawing;
    second means for comparing said result to a plurality of stored lottery entries;
    third means, if said result matches one of said plurality of stored lottery entries, for identifying said one of said plurality of stored lottery entries as a winning lottery entry;
    fourth means for identifying a first lottery entry of said plurality of stored lottery entries as a non-winning lottery entry;
    said first, second, third and fourth means continuing to operate for subsequent lottery drawings until said first lottery entry is identified as a winning lottery entry; and
    fifth means for, after said first lottery entry is identified as a winning lottery entry, arranging for said first lottery entry to not be included in subsequent lottery drawings.

14. A computer program product, comprising:
    a computer useable medium having program code thereon for operating a lottery, said program code comprising:
    first program code for receiving a result of a lottery drawing;
    second program code for comparing said result to a plurality of stored lottery entries;
    third program code, if said result matches one of said plurality of stored lottery entries, for identifying said one of said plurality of stored lottery entries as a winning lottery entry;
    fourth program code for identifying a first lottery entry of said plurality of stored lottery entries as a non-winning lottery entry;
    said first, second, third and fourth program code continuing to operate for subsequent drawings until said first lottery entry is identified as a winning lottery entry; and
    fifth program code for, after said first lottery entry is identified as a winning lottery entry, arranging for said first lottery entry to not be included in subsequent lottery drawings.

15. A method for processing lottery entries usable in a plurality of lottery drawings, comprising:
    receiving a request to purchase a lottery entry;
    receiving with said request an indicator that said lottery entry is to (i) be entered into a plurality of lottery drawings until a lottery drawing identifies said lottery entry as a winner and (ii) not be entered into lottery drawings after a lottery drawing identifies said lottery entry as a winner; and storing said lottery entry.

16. The method of claim 15, further including charging a fee for said lottery entry, said fee based at least in part on said indicator.

17. The method of claim 15, further including:

associating with said lottery entry a lottery ticket number; and storing said lottery ticket number with said lottery entry.

18. An apparatus for processing lottery entries usable in a plurality of lottery drawings, comprising:

a processor;

a memory connected to said processor;

said processor operative to receive a lottery entry, and receive with said lottery entry an indicator that said lottery entry is to (i) be entered into a plurality of lottery drawings until a final lottery drawing identifies said lottery entry as a winner and (ii) not be entered into lottery drawings after a lottery drawing identifies said lottery entry as a winner, and store said lottery entry in said memory.

19. The apparatus of claim 18, wherein said processor is further operative to calculate a fee for said lottery entry, said fee based at least in part on said indicator.

20. The apparatus of claim 18, wherein said processor is further operative to associate with said lottery entry a lottery ticket number; and store said lottery ticket number with said lottery entry in said memory.

21. An apparatus for processing lottery entries usable in a plurality of lottery drawings, comprising:

means for receiving a request to purchase a lottery entry;

means for receiving with said request an indicator that said lottery entry is to (i) be entered into a plurality of lottery drawings until a final lottery drawing identifies said lottery entry as a winner and (ii) not be entered into lottery drawings after a lottery drawing identifies said lottery entry as a winner; and means for storing said lottery entry.

22. A computer program product, comprising:

a computer useable medium having program code thereon for processing lottery entries, said program code comprising:

program code for receiving a request to purchase a lottery entry;

program code for receiving with said request an indicator that said lottery entry is to (i) be entered into a plurality of lottery drawings until a final lottery drawing identifies said lottery entry as a winner and (ii) not be entered into lottery drawings after a lottery drawing identifies said lottery entry as a winner; and program code for storing said lottery entry.

23. A method for processing lottery entries usable in a plurality of lottery drawings, comprising:

receiving a request to purchase a lottery entry;

receiving with said request an indicator that said lottery entry is to (i) be entered into a plurality of lottery drawings until a lottery drawing identifies said lottery entry as a winner and (ii) not be entered into lottery drawings after a lottery drawing identifies said lottery entry as a winner; and transmitting said request with said indicator to a remote lottery authority.

24. The method of claim 23, further including receiving from said remote lottery authority data confirming said lottery entry.

25. The method of claim 24, wherein said data includes a lottery ticket number; and further including storing said lottery ticket number.

26. The method of claim 23, wherein said receiving a request to purchase a lottery entry includes receiving a sense mark form.

27. The method of claim 26, wherein said receiving with said request an indicator includes receiving said indicator on said sense mark form.

28. The method of claim 23, further including outputting a lottery ticket identifying said lottery entry.

29. An apparatus for processing lottery entries usable in a plurality of lottery drawings, comprising;

a processor;

a memory connected to said processor and storing a request to purchase a lottery entry, an indicator, with said request, that said lottery entry is to (i) be entered into a plurality of lottery drawings until a lottery drawing identifies said lottery entry as a winner and (ii) not be entered into lottery drawings after a lottery drawing identifies said lottery entry as a winner; and said processor operative to transmit said request with said indicator to a remote lottery authority.

30. The apparatus of claim 29, wherein said processor is further operative to receive from said remote lottery authority data confirming said lottery entry.

31. The apparatus of claim 30, wherein said data includes a lottery ticket number and said processor is further operative to store said lottery ticket number in said memory.

32. The apparatus of claim 29, further comprising:

means for reading a sense mark form connected to said processor wherein said request to purchase a lottery entry includes data on a sense mark form.

33. The apparatus of claim 32, wherein said indicator includes data on said sense mark form.

34. The apparatus of claim 29, wherein said processor is further operative to generate a signal for printing a lottery ticket identifying said lottery entry.

35. An apparatus for processing lottery entries usable in a plurality of lottery drawings, comprising:

means for receiving a request to purchase a lottery entry;

means for receiving with said request an indicator that said lottery entry is to (i) be entered into a plurality of lottery drawings until a lottery drawing identifies said lottery entry as a winner and (ii) not be entered into lottery drawings after a lottery drawing identifies said lottery entry as a winner; and means for transmitting said request with said indicator to a remote lottery authority.

36. A computer program product, comprising:

a computer useable medium having program code thereon for processing lottery entries, said program code comprising:

program code for receiving a request to purchase a lottery entry;

program code for receiving with said request an indicator that said lottery entry is to (i) be entered into a plurality of lottery drawings until a lottery drawing identifies said lottery entry as a winner and (ii) not be entered into lottery drawings after a lottery drawing identifies said lottery entry as a winner; and program code for transmitting said request with said indicator to a remote lottery authority.

37. A method for generating lottery entries usable in a plurality of lottery drawings, comprising:

receiving a request to purchase a lottery entry;

receiving with said request an indicator that said lottery entry is to (i) be entered into a plurality of lottery drawings until a lottery drawing identifies said lottery entry as a winner and (ii) not be entered into lottery drawings after a lottery drawing identifies said lottery entry as a winner;

generating a ticket number for said lottery entry to validate said lottery entry and said indicator; and transmitting said ticket number to a remote terminal.

38. The method of claim 37, further including storing said lottery entry for use in at least one lottery drawing.

39. The method of claim 38, wherein said storing includes storing said lottery entry with a plurality of lottery entries to be entered into a plurality of lottery drawings.

40. The method of claim 38, further including:

generating a start date for said lottery entry; and storing said start date with said lottery entry.

41. The method of claim 37, wherein said request further includes a lottery game type.

42. The method of claim 37, further including:

generating a price for said lottery entry; and transmitting said price to said remote terminal.

43. An apparatus for generating lottery entries usable in a plurality of lottery drawings, comprising:

a processor;

a memory connected to said processor and storing
  a request to purchase a lottery entry, and
  an indicator that said lottery entry is to (i) be entered into a plurality of lottery drawings until a lottery drawing identifies said lottery entry as a winner and (ii) not be entered into lottery drawings after a lottery drawing identifies said lottery entry as a winner;

said processor operative to
  generate a ticket number for said lottery entry to validate said lottery entry and
said indicator, and
  transmit said ticket number to a remote terminal.

44. The apparatus of claim 43, wherein said memory further includes a plurality of lottery entries each to be entered into a plurality of lottery drawings.

45. The apparatus of claim 43, wherein said processor is further operative to:

generate a start date for said lottery entry; and store said start date and said lottery entry in said memory.

46. The apparatus of claim 43, wherein said request further includes a lottery game type.

47. The apparatus of claim 43, wherein said processor is further operative to:

generate a price for said lottery entry; and transmit said price to said remote terminal.

48. An apparatus for generating lottery entries usable in a plurality of lottery drawings, comprising:

means for receiving a request to purchase a lottery entry;

means for receiving with said request an indicator that said lottery entry is to (i) be entered into a plurality of lottery drawings until a lottery drawing identifies said lottery entry as a winner and (ii) not be entered into lottery drawings after a lottery drawing identifies said lottery entry as a winner;

means for generating a ticket number for said lottery entry to validate said lottery entry and said indicator; and means for transmitting said ticket number to a remote terminal.

49. A computer program product, comprising:

a computer useable medium having program code thereon for generating lottery entries, said program code comprising:

program code for receiving a request to purchase a lottery entry;

program code for receiving with said request an indicator that said lottery entry is to (i) be entered into a plurality of lottery drawings until a lottery drawing identifies said lottery entry as a winner and (ii) not be entered into lottery drawings after a lottery drawing identifies said lottery entry as a winner;

program code for generating a ticket number for said lottery entry to validate said lottery entry and said indicator; and program code for transmitting said ticket number to a remote terminal.

50. A method of pricing a lottery entry, comprising:

receiving a request to purchase a lottery entry, said request including an indicator that said lottery entry is to (i) be entered into a plurality of lottery drawings until a lottery drawing identifies said lottery entry as a winner and (ii) not be entered into lottery drawings after a lottery drawing identifies said lottery entry as a winner;

calculating a price for said lottery entry, said price based at least in part on the inclusion of said indicator.

51. The method of claim 50, wherein said calculating a price for said lottery entry includes:

determining, for a plurality of potential payouts of said lottery drawing, a total number for said plurality of potential payouts and a value for each of said plurality of potential payouts;

determining a probability of each of said plurality of potential payouts for said lottery entry; and calculating said price based at least in part on said determining a total number and said determining a probability.

52. The method of claim 50, wherein said calculating includes calculating said price based at least in part on a potential payout of a first lottery drawing including said lottery entry.

53. The method of claim 50, wherein said calculating includes calculating said price based at least in part on a potential average payout of a plurality of lottery drawings.

54. The method of claim 50, further including generating billing statements for portions of said price whereby said price can be billed in payments.

55. The method of claim 54, wherein said generating billing statements includes generating credit card billing statements.

56. An apparatus for pricing a lottery entry, comprising:

a processor;

a memory connected to said processor and storing a request to purchase a lottery entry, said request including an indicator that said lottery entry is to (i) be entered into a plurality of lottery drawings until a lottery drawing identifies said lottery entry as a winner and (ii) not be entered into lottery drawings after a lottery drawing identifies said lottery entry as a winner;

said processor operative to calculate a price for said lottery entry, said price based at least in part on the inclusion of said indicator, and store said price in said memory.

57. The apparatus of claim 56, wherein said operation of calculating a price for said lottery entry includes the operations of:

determining, for a plurality of potential payouts of said lottery drawing, a total number for said plurality of potential payouts and a value for each of said plurality of potential payouts;

determining a probability of each of said plurality of potential payouts for said lottery entry; and calculating said price based at least in part on the results of said determining a total number and said determining a probability.

58. The apparatus of claim 56, wherein said calculating operation includes calculating said price based at least in part on a potential payout of a first lottery drawing including said lottery entry.

59. The apparatus of claim 56, wherein said calculating operation includes calculating said price based at least in part on a potential average payout of a plurality of lottery drawings.

60. An apparatus for pricing a lottery entry, comprising:

means for receiving a request to purchase a lottery entry, said request including an indicator that said lottery entry is to (i) be entered into a plurality of lottery drawings until a lottery drawing identifies said lottery entry as a winner and (ii) not be entered into lottery drawings after a lottery drawing identifies said lottery entry as a winner;

means for calculating a price for said lottery entry, said price based at least in part on the inclusion of said indicator.

61. A computer program product, comprising:

a computer useable medium having program code thereon for pricing lottery entries, said program code comprising:

program code for receiving a request to purchase a lottery entry, said request including an indicator that said lottery entry is to (i) be entered into a plurality of lottery drawings until a lottery drawing identifies said lottery entry as a winner and (ii) not be entered into lottery drawings after a lottery drawing identifies said lottery entry as a winner; and program code for calculating a price for said lottery entry, said price based at least in part on the inclusion of said indicator.

62. A method of reporting the status of a lottery entry, comprising:

receiving a request for a status of a lottery entry, said lottery entry of a type to (i) be entered into a plurality of lottery drawings until a lottery drawing identifies said lottery entry as a winner and (ii) not be entered into lottery drawings after a lottery drawing identifies said lottery entry as a winner; and outputting said status of said lottery entry.

63. The method of claim 62, wherein said status indicates if said lottery entry is a winning lottery entry or a non-winning lottery entry.

64. The method of claim 63, further including, if said status indicates that said lottery entry is a winning lottery entry, outputting a drawing date for said winning lottery entry.

65. The method of claim 62, wherein said outputting includes transmitting said status over a telephone line.

66. The method of claim 62, wherein said outputting includes transmitting said status over a computer data network.

67. An apparatus for reporting the status of a lottery entry, comprising:

a processor;

a memory connected to said processor and storing a lottery entry of a type to (i) be entered into a plurality of lottery drawings until a lottery drawing identifies said lottery entry as a winner and (ii) not be entered into lottery drawings after a lottery drawing identifies said lottery entry as a winner;

said processor operative to receive a request for a status of said lottery entry, and output said status of said lottery entry.

68. The apparatus of claim 67, wherein said status indicates if said lottery entry is a winning lottery entry or a non-winning lottery entry.

69. The apparatus of claim 68, wherein:

said memory further stores a drawing date for said winning lottery entry; and said processor is further operative, if said status indicates that said lottery entry is a winning lottery entry, to output said drawing date.

70. The apparatus of claim 67, further including an output device connected to said processor for transmitting signals indicative of said status over a telephone line.

71. The apparatus of claim 67, further including an output device connected to said processor for transmitting signals indicative of said status over a computer data network.

72. An apparatus for reporting the status of a lottery entry, comprising:

means for receiving a request for a status of a lottery entry, said lottery entry of a type to (i) be entered into a plurality of lottery drawings until a lottery drawing identifies said lottery entry as a winner and (ii) not be entered into lottery drawings after a lottery drawing identifies said lottery entry as a winner; and means for outputting said status of said lottery entry.

73. A computer program product, comprising:

a computer useable medium having program code thereon for reporting a status of lottery entries, said program code comprising:

program code for receiving a request for a status of a lottery entry, said lottery entry of a type to (i) be entered into a plurality of lottery drawings until a lottery drawing identifies said lottery entry as a winner and (ii) not be entered into lottery drawings after a lottery drawing identifies said lottery entry as a winner; and program code for outputting said status of said lottery entry.

74. A method of operating a lottery, comprising:

arranging for each of a plurality of players to be associated with a plurality of lottery entries, the plurality of players providing payment of a plurality of entry fees;

conducting a lottery drawing to determine that a first lottery entry is a winning lottery entry;

arranging for a player associated with the first lottery entry to receive a payment including at least a portion of the plurality of entry fees; and automatically entering a second lottery entry in at least one subsequent lottery drawing based on the performance of the second lottery entry in at least one previous lottery drawing.

75. The method of claim 74, wherein a third lottery entry of the plurality of lottery entries is not automatically entered in at least one subsequent lottery drawing regardless of the performance of the third lottery entry in previous lottery drawings.

76. The method of claim 74, wherein the second lottery entry is not automatically entered in subsequent lottery drawings after the second lottery entry has been identified as a winner in at least one previous lottery drawing.

\* \* \* \* \*